United States Patent
Yamaguchi et al.

(10) Patent No.: US 7,320,112 B2
(45) Date of Patent: Jan. 15, 2008

(54) INFORMATION PROCESSING APPARATUS AND METHOD, AND INFORMATION PROCESSING PROGRAM

(75) Inventors: Yoshihiro Yamaguchi, Tokyo (JP); Soichi Sato, Tokyo (JP); Yoshitaka Narukawa, Chiba (JP); Kenichi Agata, Tokyo (JP); Takashi Yamamoto, Kanagawa (JP); Kaoru Hayashi, Kanagawa (JP); Osamu Gomibuchi, Chiba (JP)

(73) Assignee: Sony Corporation, Tokyo (JP)

( * ) Notice: Subject to any disclaimer, the term of this patent is extended or adjusted under 35 U.S.C. 154(b) by 320 days.

(21) Appl. No.: 09/947,324

(22) Filed: Sep. 5, 2001

(65) Prior Publication Data

US 2002/0087747 A1 Jul. 4, 2002

(30) Foreign Application Priority Data

Sep. 7, 2000 (JP) ............................. 2000-272242
Apr. 12, 2001 (JP) ............................. 2001-114539

(51) Int. Cl.
*G06F 3/00* (2006.01)
(52) U.S. Cl. ....................... 715/831; 715/713; 715/802; 715/744; 715/796
(58) Field of Classification Search ........ 345/708–713, 345/802, 744–747, 828–831, 794–796
See application file for complete search history.

(56) References Cited

U.S. PATENT DOCUMENTS

| | | | | |
|---|---|---|---|---|
| 5,363,481 A * | 11/1994 | Tilt | ............................. | 345/814 |
| 5,377,319 A * | 12/1994 | Kitahara et al. | ............. | 345/707 |
| 5,608,860 A * | 3/1997 | Fitzpatrick et al. | ......... | 715/826 |
| 6,020,889 A * | 2/2000 | Tarbox et al. | ............... | 715/736 |
| 6,097,371 A * | 8/2000 | Siddiqui et al. | ............ | 345/164 |
| 6,101,498 A * | 8/2000 | Scaer et al. | ................... | 707/10 |
| 6,111,575 A * | 8/2000 | Martinez et al. | ............ | 345/810 |
| 6,147,683 A * | 11/2000 | Martinez et al. | ............ | 715/786 |
| 6,177,936 B1 * | 1/2001 | Cragun | ....................... | 345/760 |
| 6,598,970 B2 * | 7/2003 | Itoh | ............................ | 351/206 |
| 6,662,365 B1 * | 12/2003 | Sullivan et al. | ............... | 725/25 |
| 6,879,244 B1 * | 4/2005 | Scalisi | ........................ | 340/7.2 |
| 6,919,879 B2 * | 7/2005 | Griffin et al. | ............... | 345/168 |
| 6,965,782 B1 * | 11/2005 | Nuovo et al. | ............... | 345/167 |

\* cited by examiner

*Primary Examiner*—Kristine Kincaid
*Assistant Examiner*—Peng Ke
(74) *Attorney, Agent, or Firm*—Oblon, Spivak, McClelland, Maier & Neustadt, P.C.

(57) ABSTRACT

Executing a desired processing immediately by a simple operation using a jog dial for example. The display unit (3) has a jog dial (4) (a first operating means) and a back button (5) (second operating means) provided vertically at the right upper corner thereof. The jog dial (4) can be rotated and pushed. The back button (5) is to undo an operation having been made by pushing the jog dial (4), and it is located near the jog dial (5).

7 Claims, 29 Drawing Sheets

CW ROTATION

SIGNAL A

SIGNAL B

CCW ROTATION

SIGNAL A

SIGNAL B

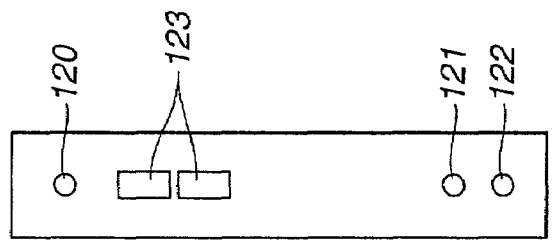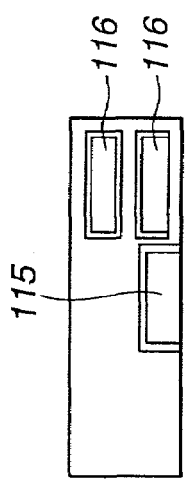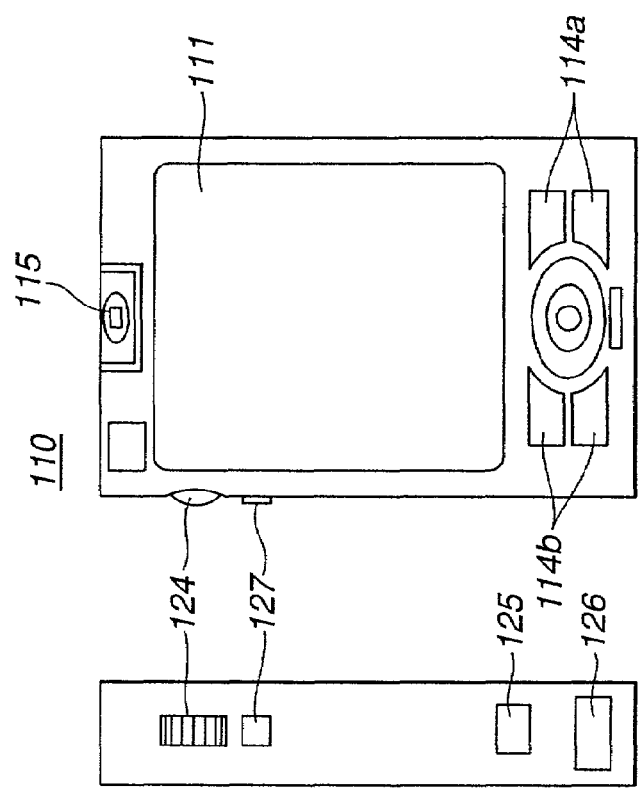
FIG.25B
FIG.25D
FIG.25A
FIG.25C

US 7,320,112 B2

INFORMATION PROCESSING APPARATUS AND METHOD, AND INFORMATION PROCESSING PROGRAM

BACKGROUND OF THE INVENTION

1. Field of the Invention

The present invention relates to an information processing apparatus and method, and an information processing program, and more particularly, to an information processor, information processing method and an information processing program, adapted to execute a desired processing by a simple operation using a jog dial for example.

2. Description of the Related Art

Recently, there have been proposed operating systems for a computer including peripheral devices such as a mouse, keyboard, video display, etc. and a central processing unit (CPU). Typical ones of such operating systems are Windows 95 and Windows 98 (trademark), trademarks of the Microsoft Corporation, USA. These operating systems provide a taskbar for each application having an active window, by which the user can have visual mnemonics like buttons. The technique directed to the use of such a taskbar is disclosed in detail in the Japanese Published Application No. 8-255066.

The use of the taskbar will further be described below by referring to the above Japanese Published Application. Serving as a visual mnemonic, the taskbar can be used to give the user information on a currently active window and display the active window. The taskbar includes a start menu button for enabling the user to access a menu in order to control program launching, document opening and system setting.

Operation of the start menu button on the taskbar in a computer system includes examples which will be described herebelow. The start menu button opens a start menu as a home position for the user to access a program, document, system setting information, help information, etc. By moving the mouse until the on-screen cursor points to the start menu button and clicking on the left button of the mouse, the start menu will be opened on the screen.

The start menu includes menu items such as "PROGRAM", "FIND", "SET", "HELP", etc. Selecting the "PROGRAM" menu item in the start menu will permit access from the start menu to a program menu having a hierarchical structure. The program menu includes a plurality of user-selectable application programs and program groups.

It should be reminded that after the user selects a desired application program in the task bar with the start menu button, he or she will have to repeat complicated operations until the selected application program starts to run.

That is, first the user moves the mouse to point the on-screen cursor to the start menu button on the taskbar and clicks on the left button of the mouse to open the start menu. Next, the user moves the mouse to point the cursor to the menu item "PROGRAM" in the start menu and clicks on the left mouse button to open the program menu. Then, the user moves the mouse to point the cursor to a desired application program displayed in the program menu and clicks on the left mouse button. In case the user has selected an application program group in the same manner, the user will have to repeatedly point the cursor and click on the mouse cursor. Thereafter, the CPU will put the desired application program into run.

As in the above, the user has to repeat such complicated operations until his desired application program starts to run. Namely, the taskbar is not any easy tool as a user interface. This is also true for doing a desired operation by clicking a menu item such as "HELP" in the start menu program.

Also, the taskbar cannot implement any user's desire to readily view an electronic mail in the computer or to start a desired application software.

OBJECT AND SUMMARY OF THE INVENTION

It is therefore an object of the present invention to overcome the above-mentioned drawbacks of the prior art by providing an information processor, information processing method, and an information processing program, capable of executing a desired processing immediately by a simple operation using a jog dial for example.

It is another object of the present invention to provide an information processor, information processing method, and an information processing program, capable of undoing an operation once done by pushing a jog dial, for facilitating the user to do operations.

According to the present invention, there is provided an information processor for processing information signal based on an application program and displaying a result and process of the processing operation on a display unit, the apparatus including a first operating means which can be rotated and pushed, a second operating means for undoing an operation once done by pushing the first operating means, and a controlling means for monitoring the operated status of the first and second operating means and displaying an operation window corresponding to each of the operations made with the operating means on the display unit according to a status of the application program.

According to the present invention, there is also provided an information processing method for processing information signal based on an application program and displaying a result and process of the processing operation on a display unit, the method including steps of monitoring the operated status of a first operating means which can be rotated and pushed, and that of a second operating means which can undo an operation once done by pushing the first operating means, and displaying an operation window corresponding to each of the operations made with the first and second operating means on the display unit.

According to the present invention, there is also provided an information processing program for processing information signal based on an application program and displaying a result and process of the processing operation on a display unit, the method including steps of monitoring the operated status of a first operating means which can be rotated and pushed, and that of a second operating means which can undo an operation once done by pushing the first operating means, and displaying an operation window corresponding to each of the operations made with the first and second operating means on the display unit.

According to the present invention, there is also provided an information processor for processing information signal based on an application program and displaying a result and process of the processing operation on a display unit, the apparatus including an operating means which can be rotated and pushed, and a controlling means for monitoring the operated status of the operating means and displaying an operation window corresponding to each of the operations made with the operating means on the display unit according to a status of the application program, the controlling means detecting a first pushed status of the operating means, in which the operating means has not been pushed for a time longer than a predetermined length of time and a second pushed status of the operating means, in which the operating means has been pushed for the time longer than the predetermined length of time, as differentiated between them, and undoing an operation once done because the first pushed status has been detected when the second pushed status is detected.

According to the present invention, there is also provided an information processing method for processing information signal based on an application program and displaying a result and process of the processing operation on a display unit, the method including steps of monitoring whether an operating means which can be rotated and pushed has been operated, receiving a notice of the monitoring that the operating means has been operated, and then differentiating between a first pushed status of the operating means, in which the operating means has not been pushed for a time longer than a predetermined length of time, and a second pushed status of the operating means, in which the operating means has been pushed for the time longer than the predetermined length of time, effecting an operation based on a result of the differentiation, and displaying a result of the operation based on the result of differentiation on the display unit.

According to the present invention, there is also provided a program for processing information signal based on an application program and displaying a result and process of the processing operation on a display unit, the program including steps of monitoring whether an operating means which can be rotated and pushed has been operated, receiving a notice of the monitoring that the operating means has been operated, and then differentiating between a first pushed status of the operating means, in which the operating means has not been pushed for a time longer than a predetermined length of time, and a second pushed status of the operating means, in which the operating means has been pushed for the time longer than the predetermined length of time, effecting an operation based on a result of the differentiation, and displaying a result of the operation based on the result of differentiation on the display unit.

According to the present invention, an operation once done by pushing the first operating means can be redone simply by pressing the second operating means, which enables the user to operate the information processor more easily.

Also, according to the present invention, an operation once done by pushing the rotating and pushing type operating means can be redone by a software, without having to provide any hardware provided to this end, through judgment of whether the means has been pushed for a time longer than a predetermined one.

These objects and other objects, features and advantages of the present invention will become more apparent from the following detailed description of the preferred embodiments of the present invention when taken in conjunction with the accompanying drawings.

BRIEF DESCRIPTION OF THE DRAWINGS

FIG. 19 is a flow chart of operations effected by a CPU in the notebook PC when executing a jog dial- or back button-status monitoring program after a power switch is turned on;

FIG. 25 shows an appearance of a portable digital assistant (PDA) which is a third embodiment of the present invention;

FIG. 30 is a flow chart of operations effected when a CPU in the notebook PC which is the fourth embodiment of the present invention executes a jog dial status monitoring program after the power switch is turned on;

DETAILED DESCRIPTION OF THE PREFERRED EMBODIMENTS

A notebook personal computer (PC) as the first embodiment of the present invention in which the information processor, information processing method and information processing program according to the present invention are applied, will be described first with reference to FIGS. 1 to 23.

Figure 1:
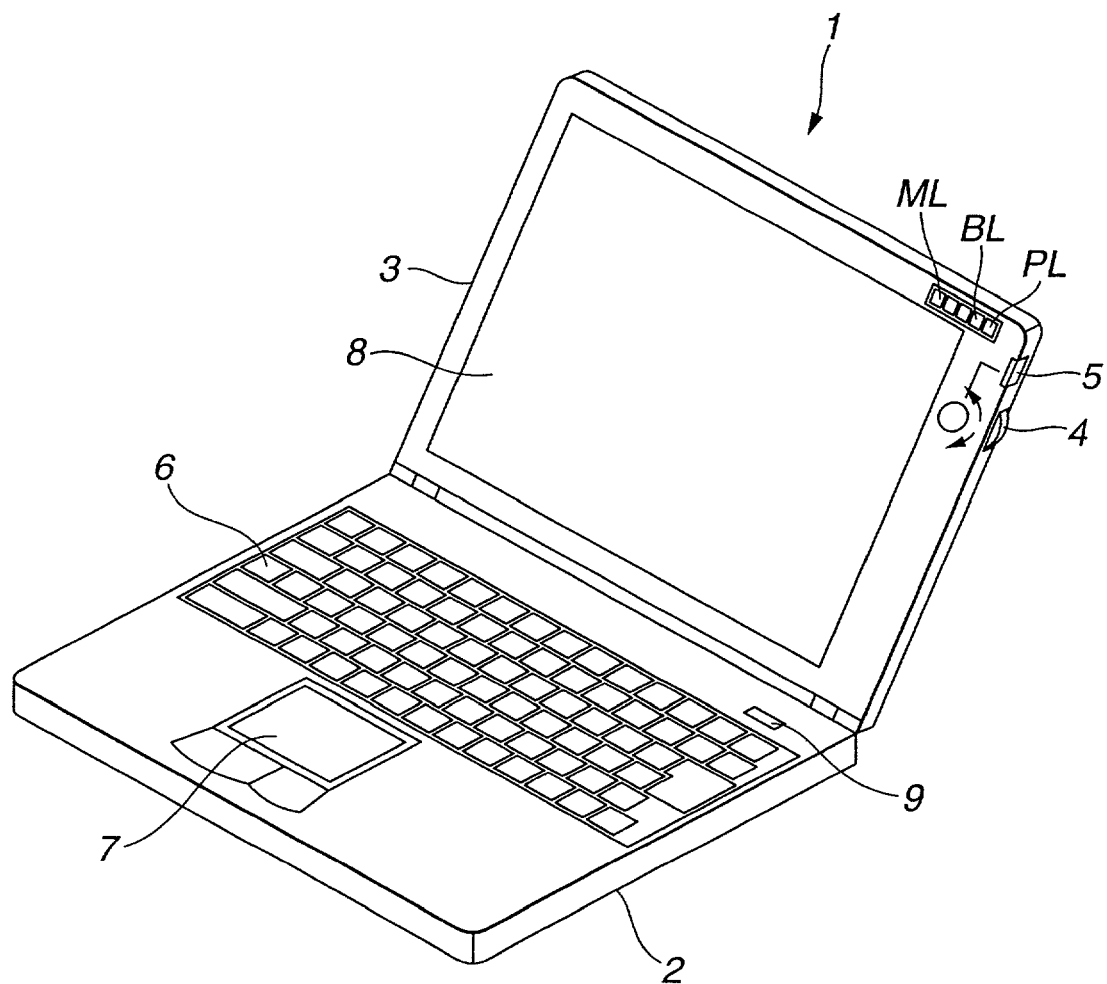
FIG. 1 is a perspective external view of a notebook PC (personal computer) in which the present invention is applied.
Figure 2:
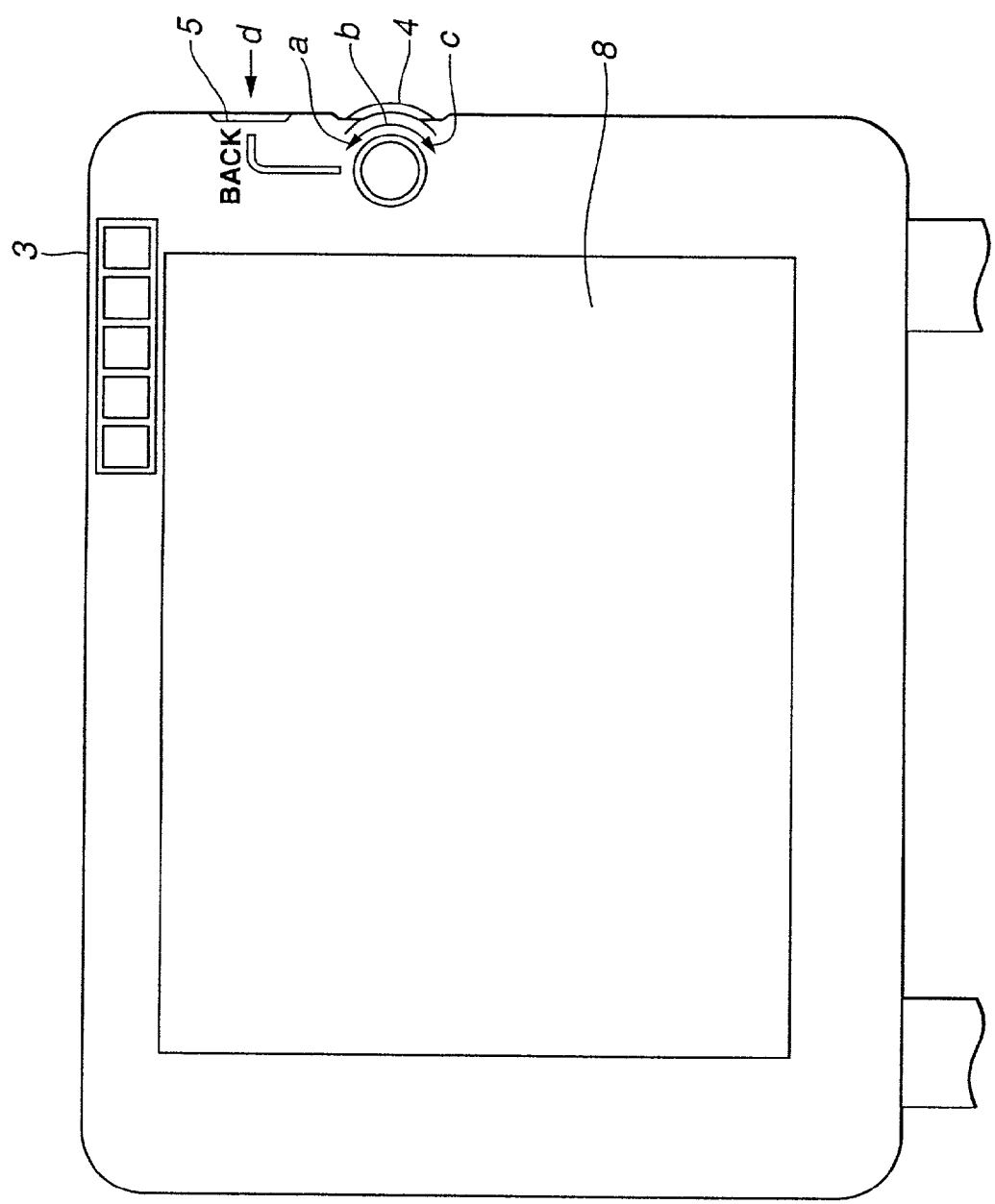
FIG. 2 is a plan view of the notebook PC in FIG. 1, showing essential portions of the notebook PC as enlarged in scale.
Figure 3:
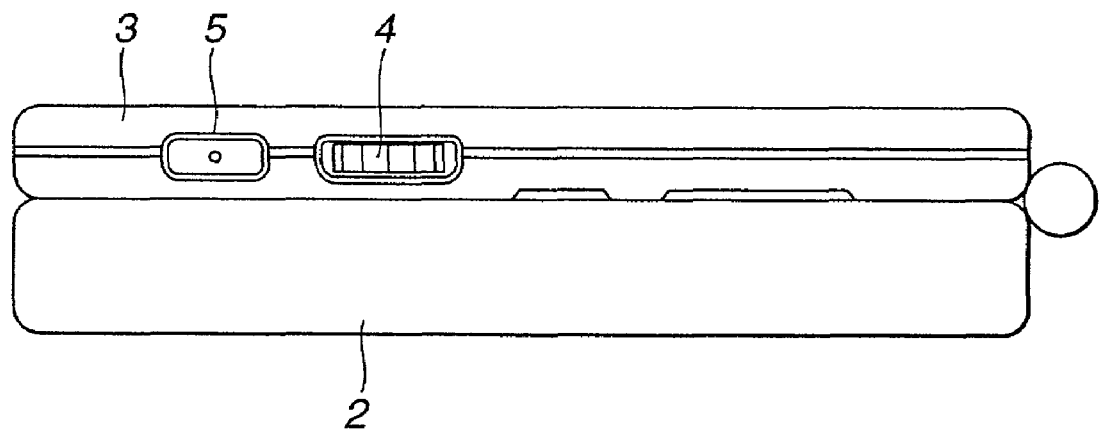
FIG. 3 is a side elevation of the notebook PC in FIG. 1, showing the essential portions of the notebook PC.

FIGS. 1 to 3 schematically shows the notebook PC. The notebook PC is generally indicated with a reference 1. As shown, the notebook PC 1 is essentially composed of a body unit 2 and a display unit 3 installed to the body unit 2 so that it can be freely opened and closed. FIG. 1 is a perspective external view, showing the display unit 3 opened from the body unit 2. FIG. 2 is a plan view of the display unit 3. FIG. 3 is a side elevation, showing the display unit 3 closed to the body unit 2.

The body unit 2 of the notebook PC 1 has provided on the top surface thereof a keyboard 6 which is operated for entering various characters and symbols, a touch pad 7, as a pointing device, which is operated for moving an on-screen mouse cursor and for similar purposes, and a power switch 9 to turn on and off the notebook PC 1.

The display unit 3 has a jog dial 4 (a first operating means) and a back button 5 (second operating means) provided vertically at the right upper corner thereof. The jog dial 4 can be rotated and pushed. The back button 5 is to undo an operation having been made by pushing the jog dial 4, and it is located near the jog dial 5 as shown.

Further, the display unit 3 has an LCD (liquid crystal display) 8 to display an image. Moreover, the display unit 3 has provided horizontally at the right upper corner thereof a pilot lamp PL, battery lamp BL, other lamps and a message lamp ML (provided as necessary). Each of these lamps is an LED (light emitting diode).

Next, the jog dial 4 will further be described. The jog dial 4 can be turned in directions of arrows a and c (counter-clockwise and clockwise, respectively) as shown in FIG. 2, and also can be pushed in the direction of arrow b also in FIG. 2. Each of the clockwise and counterclockwise turns and pushing of the jog dial 4 allows a predetermined operation to be done. The predetermined operations allowed by operating the jog dial 4 will be described later.

First, the construction of the jog dial 4 will be described. This jog dial 4 is an embodiment of the rotary electronic part with a push switch, disclosed in the Japanese Published Application No. 8-203387 filed by the co-applicant of the present invention.

Figure 4:
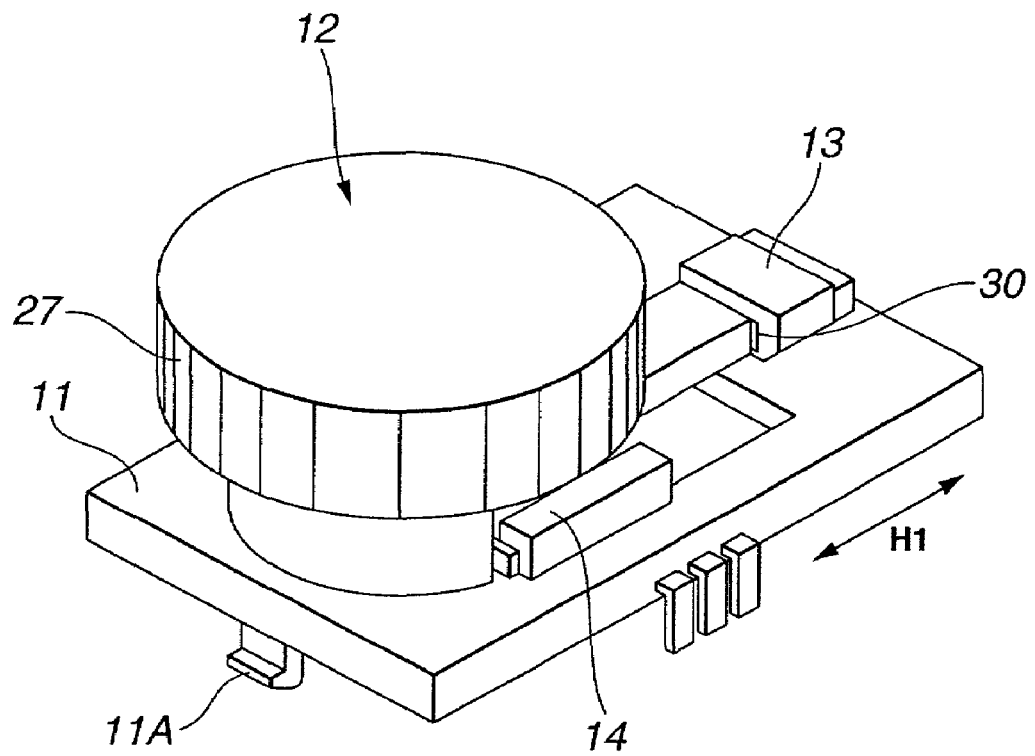
FIG. 4 is a perspective external view of a jog dial.

That is, the jog dial 4 includes a rotary encoder 12 and push switch 13 disposed on a contact carrying board 11 as shown in FIG. 4. The rotary encoder 12 is movable horizontally within a predetermined range, but the push switch 13 is fixed against movement.

Figure 5:
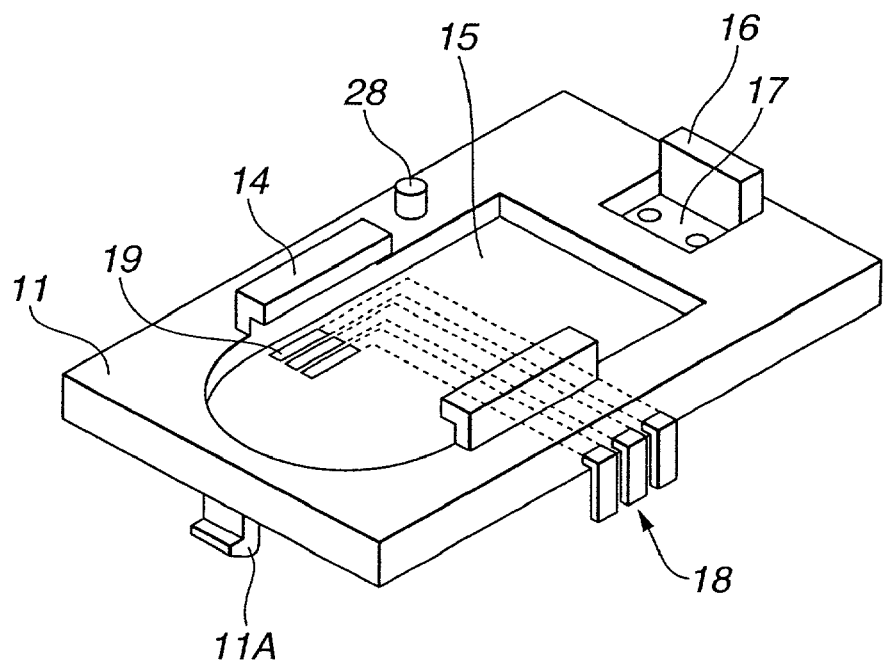
FIG. 5 is a perspective external view of a contact carrying board being an essential portion of the jog dial in FIG. 4.

As shown in FIG. 5, the contact carrying board 11 is a molded resin board having formed therein concavities 15 and 17. The concavity 15 has guide rails 14 provided along the lateral sides thereof and opposite to each other, and along which the rotary encoder 12 is movable. A stop wall 16 is provided in the concavity 17 to secure the push switch 13.

Also, contact strips 19 each with a terminal 18 are provided in the concavity 17 to transmit an electric signal from the rotary encoder 12 to outside.

Figure 6:
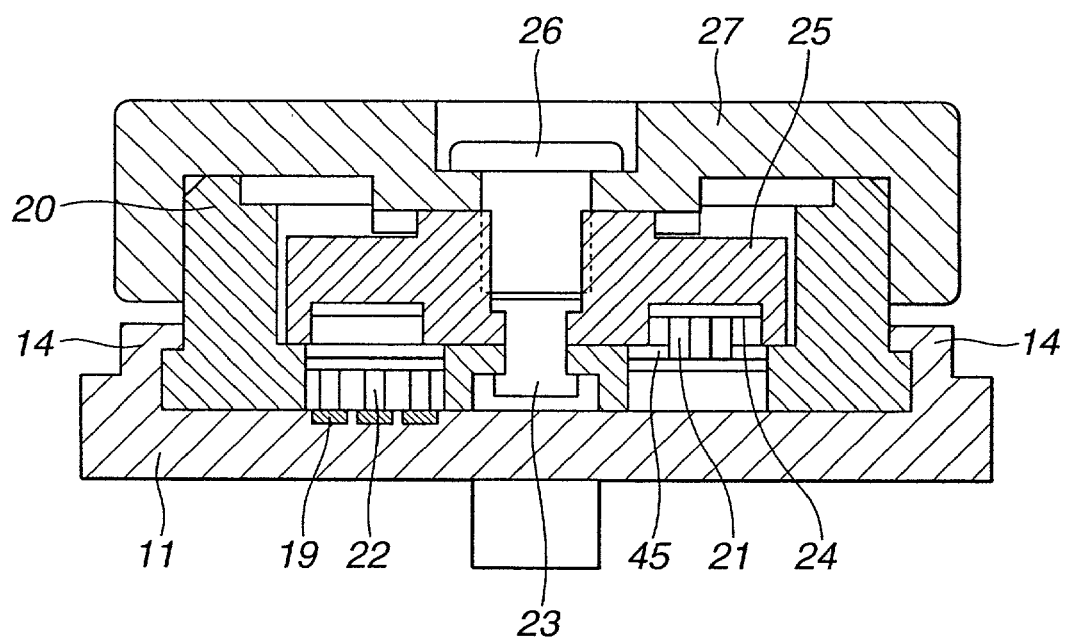
FIG. 6 is a front, sectional view of the jog dial in FIG. 4.
Figure 7:
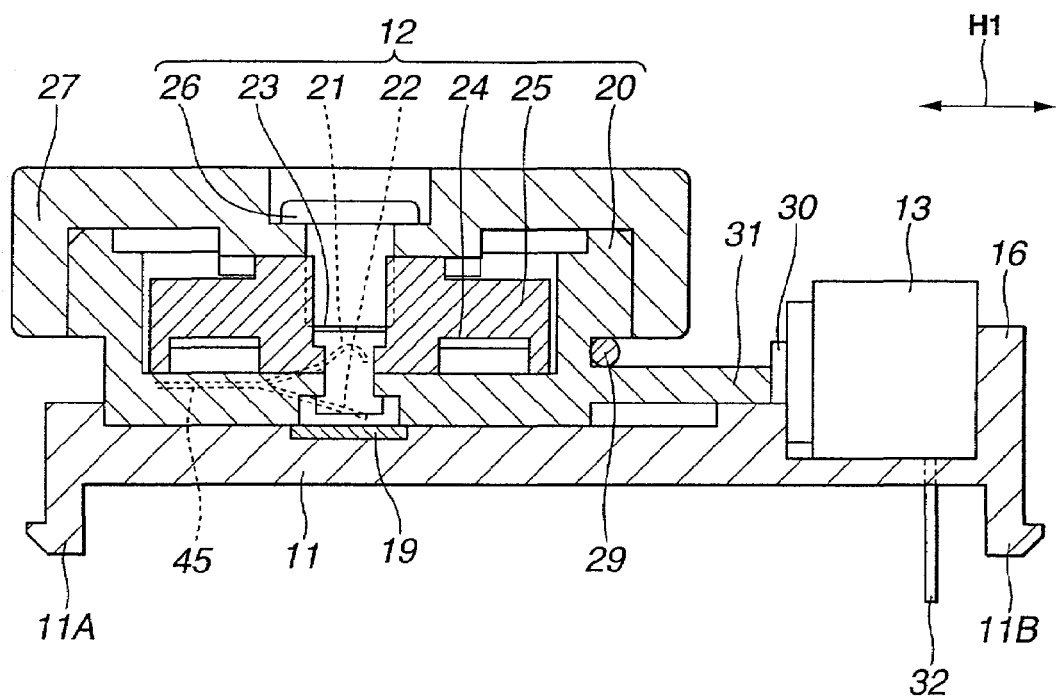
FIG. 7 is a side, sectional view of the jog dial in FIG. 4.

As shown in FIGS. 6 and 7, the rotary encoder 12 is composed of a box-like case 20, elastic contact legs 21 and 22, rotor 25 and a disc-like control knob 27. The case 20 is a resin molding. It is fitted in the concavity 15 formed in the contact carrying board 11 and held therein by the guide rails 14 to be movable in a horizontal direction (in the direction of arrow H1 in FIGS. 4 and 7) within a predetermined range. The elastic contact legs 21 and 22 are projected upward and downward, respectively, from an elastic contact block 45 installed to the bottom surface of the box case 20 by insert-molding. The rotor 25 is also a resin molding. It is held rotatably on a cylindrical shaft 23 formed integrally in the middle of the box case 20 and has circularly and radially disposed disc-like contact strips 24. The elastic contact legs 21 are in elastic contact with the lower side of the rotor 25. The disc-like control knob 27 is fixed to the top of the rotor 25 with a screw 26 to rotate the rotor 25. The control knob 27 is to be rotated with fingers applied the lateral periphery thereof Further, a pin-like projection 28 is provided on the contact carrying board 11 (see FIGS. 5 and 9) to position a torsion coil spring 29. The torsion coil spring 29 presses the lateral side of the box case 20 so that the rotary encoder 12 is normally forced away from the push switch 13 while the elastic contact legs 22 projected downward from the bottom of the box case 20 are kept in elastic contact with the contact strips 19 on the contact carrying board 11.

As shown in FIGS. 4 and 5, the push switch 13 has an operating button 30 fitted and fixed in the concavity 17 of the contact carrying board 11 to be opposite to the rotary encoder 12 and abut at the read end thereof the stop wall 16.

Figure 8:
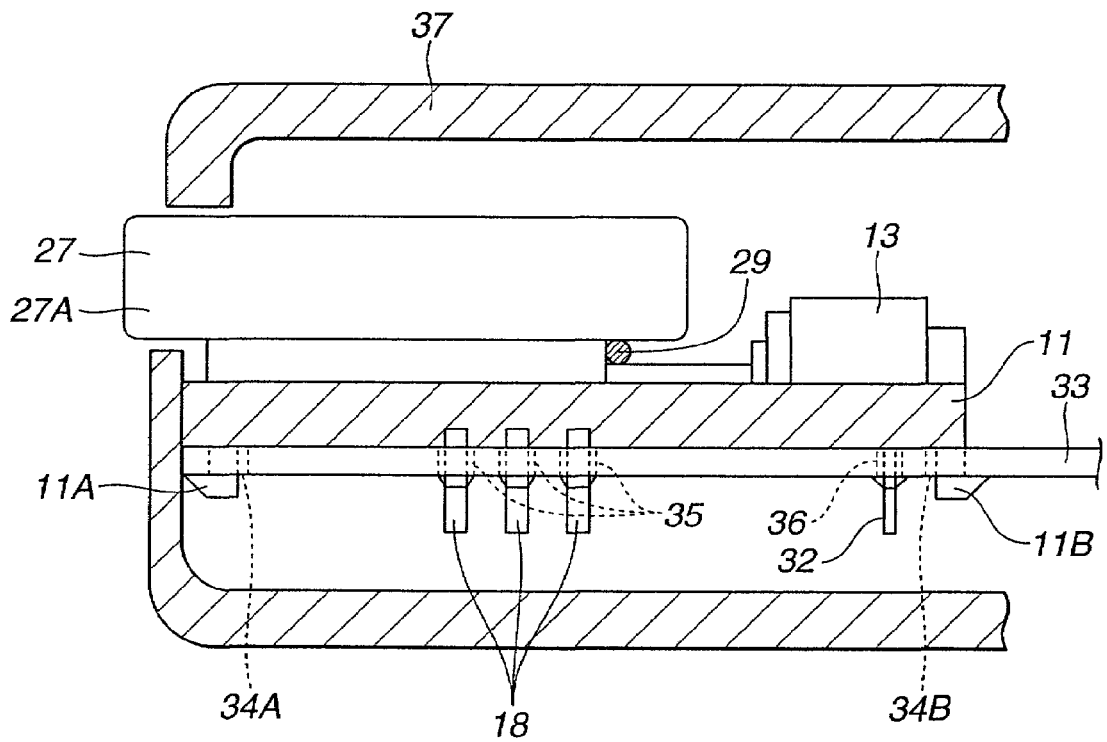
FIG. 8 is a side elevation of a device in which the jog dial in FIG. 4 is provided, showing the installation of the jog dial to the apparatus.

As best shown in FIG. 7, the box case 20 of the rotary encoder 12 has a driving projection 31 formed integrally therewith and which abuts the end of the operating button 30 of the push switch 13. The jog dial 4 is constructed as in the above. The jog dial 4 is installed to an electronic device as follows. As shown in FIG. 8, legs 11A and 11B formed at the bottom of the contact carrying board 11 are detent-inserted into fixing holes 34A and 34B formed in a printed wiring board 33 of the electronic device, the connecting terminals 18 of the rotary encoder 12 are inserted into fixing holes 35 in the printed wiring board 33, and connecting terminals 32 provided to the push switch 13 are inserted into fixing holes 36 in the printed wiring board 33. The terminals 18 and 32 thus inserted in the respective fixing holes 35 and 36 are fixed there by soldering. The disc-like control knob 27 of the rotary encoder 12 is installed to the electronic device with the end thereof opposite to the push switch 13 projected out of a slot formed in an outer case 37 of the electronic device as also shown in FIG. 8.

Figure 9:
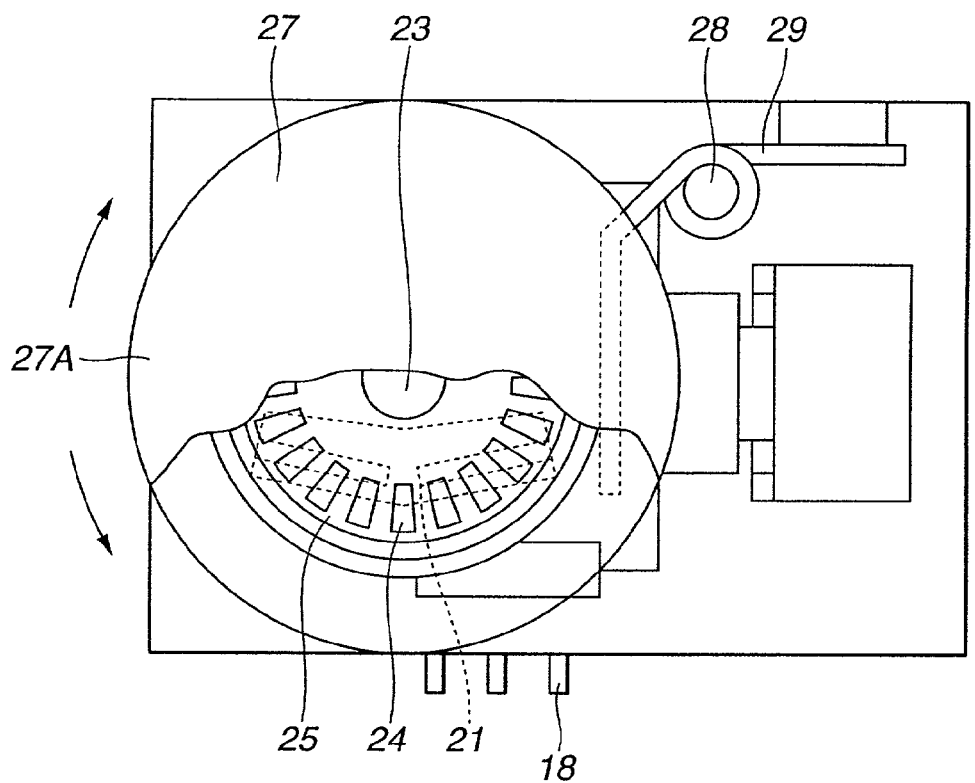
FIG. 9 is a partially fragmentary top view of the jog dial in FIG. 4, showing a rotary encoder used in the jog dial.

The jog dial constructed as in the above functions as will be described below. As shown in FIGS. 8 and 9, as the disc-like control knob 27 installed to the top of the rotary encoder 12 is turned by applying a force tangentially to a portion 27A thereof projecting from the outer case 37 of the electronic device, the rotor 25 is rotated about the cylindrical shaft 23 in the middle of the box case 20 while the upper elastic contact leg 21 are slid in elastic contact with and on the radially and circularly disposed contact strips 24 on the lower side of the rotor 25, whereby each point of contact between the contact leg 21 and strip 24 produce a pulsed signal synchronous with the rotation of the disc-like control knob 27.

The pulse signal is transmitted from the upper elastic contact leg 21 to the lower elastic contact leg 22 and further to the contact strip 19 on the contact carrying board 11 with which the elastic contact leg 22 is in elastic contact, and then it is transmitted to a circuit formed on the printed wiring board 33 in the electronic device via the external connection terminal 18.

Figure 10:
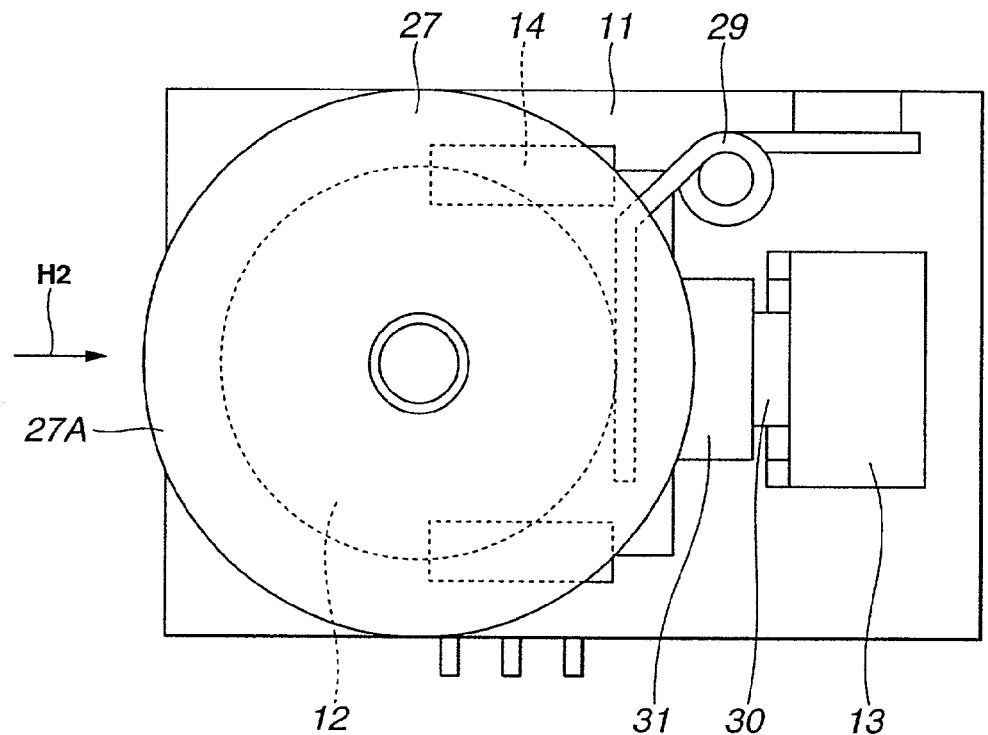
FIG. 10 is a top view of a push switch of the jog dial in FIG. 4.

When a pressure is applied to the projecting portion 27A of the disc-like control knob 27 in a horizontal direction connecting the center of the knob 27 and the push switch 13 (in the direction of arrow H2) against the force of the torsion coil spring 29 above the contact carrying board 11 as shown in FIG. 10 (that is, when the control knob 27 is pushed in), the whole rotary encoder 12 is moved horizontally along the guide rails 14 on the contact carrying board 11 and thus the driving projection 31 formed integrally with the box case 20 pushes the operating button 30 to activate the push switch 31 which will thus produce a signal. The signal from the push switch 13 is transmitted to the circuit on the printed wiring board 33 in the electronic device via the connecting terminal 32 shown in FIG. 8.

When the pressure applied to the disc-like control knob 27 is removed (that is, when the control knob 27 is released), the rotary encoder 12 is forced back to the home position as shown in FIG. 9 under the action of an elastic restoring force of the torsion coil spring 29 provided above the contact carrying board 11.

For transmission of an electric signal from the rotary encoder 12 to the connecting terminals 18 of the contact carrying board 11, the elastic contact legs 22 projecting downward from the bottom of the box case 20 of the rotary encoder 12 are put into elastic contact with the contact strips 19 on the bottom of the contact carrying board 11 as in the above. Note however that the present invention is not limited to the above arrangement of the contacts but upward projecting elastic contact legs may be provided on the contact carrying board 11 while contact strips may be disposed on the lower side of the box case 20 so that the contact legs can be put into elastic contact with the contact strips.

The back button 5 undoes an operation having been effected by pushing the jog dial 4. It is located in the vicinity of the jog dial 4. The jog dial 4 and back button 5 are located at the right upper corner of the display unit 3 as shown in FIGS. 1 to 3. When pressed in the direction of arrow d in FIG. 2, the back button 5 has the contacts thereof closed to produce an ON signal. However, since the back button 5 is of a well-known type, it will not be described in detail.

Figure 11:
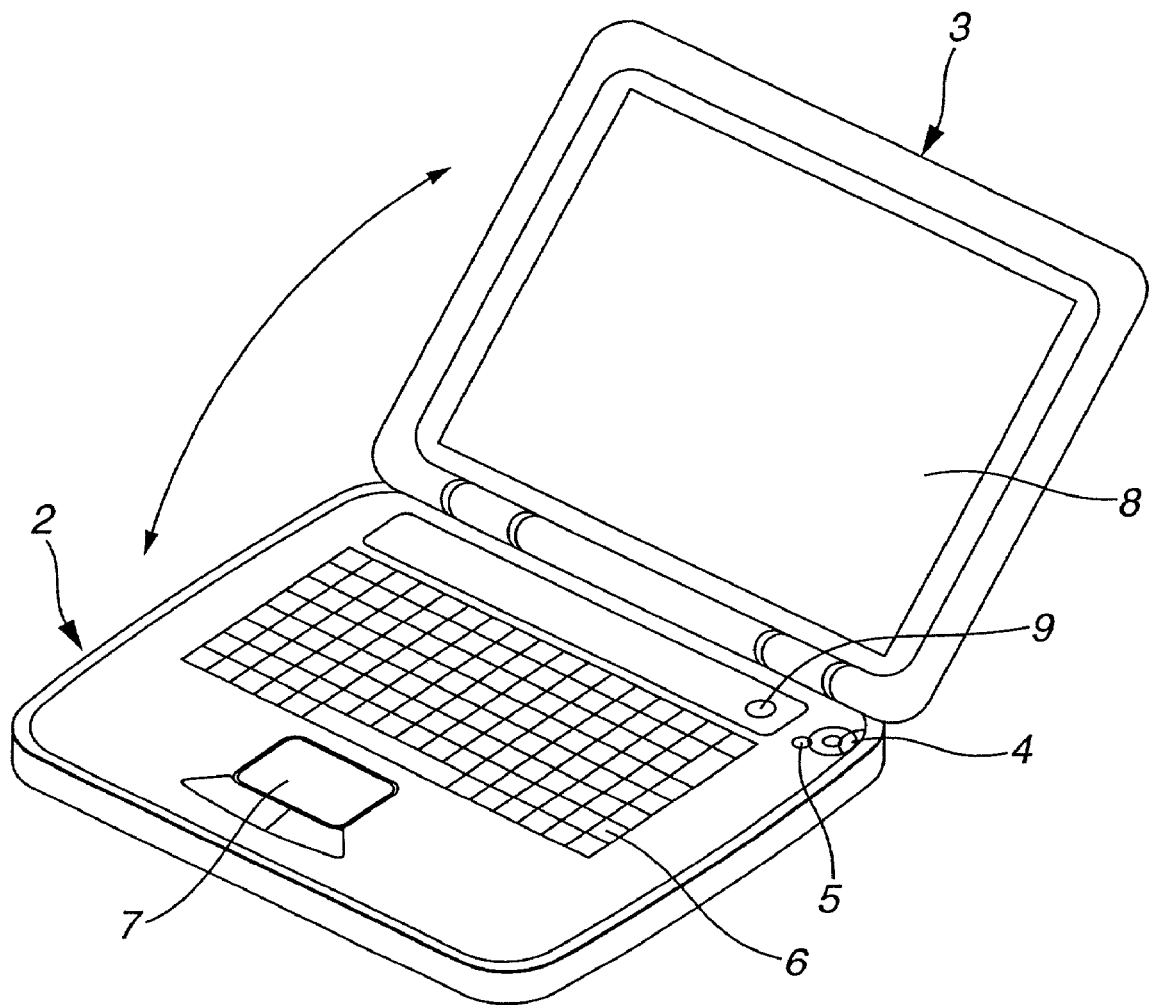
FIG. 11 is a perspective external view of another notebook PC in which the present invention is applied.
Figure 12:
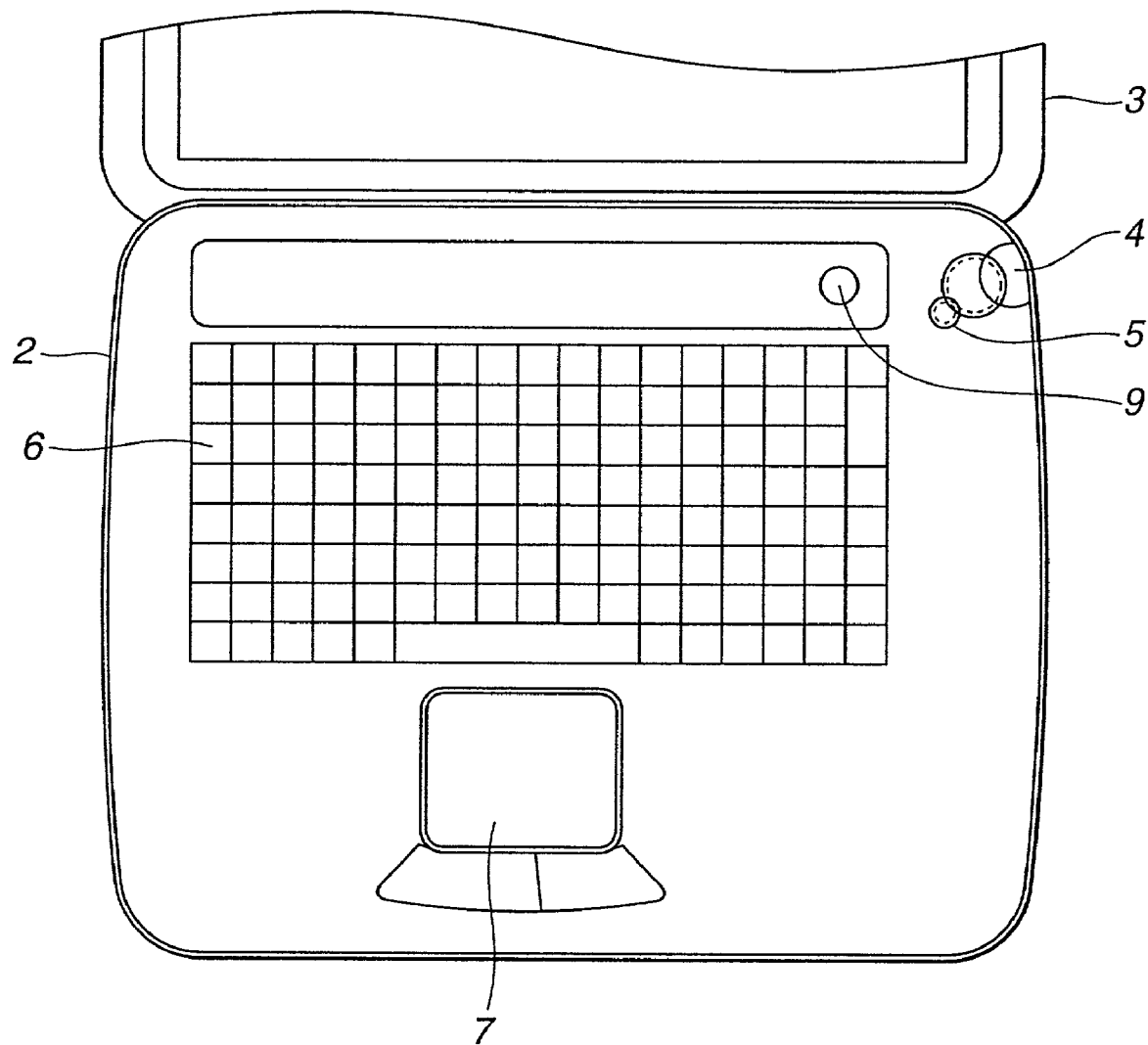
FIG. 12 is a plan view of the notebook PC in FIG. 11, showing essential portions of the notebook PC as enlarged in scale.
Figure 13:
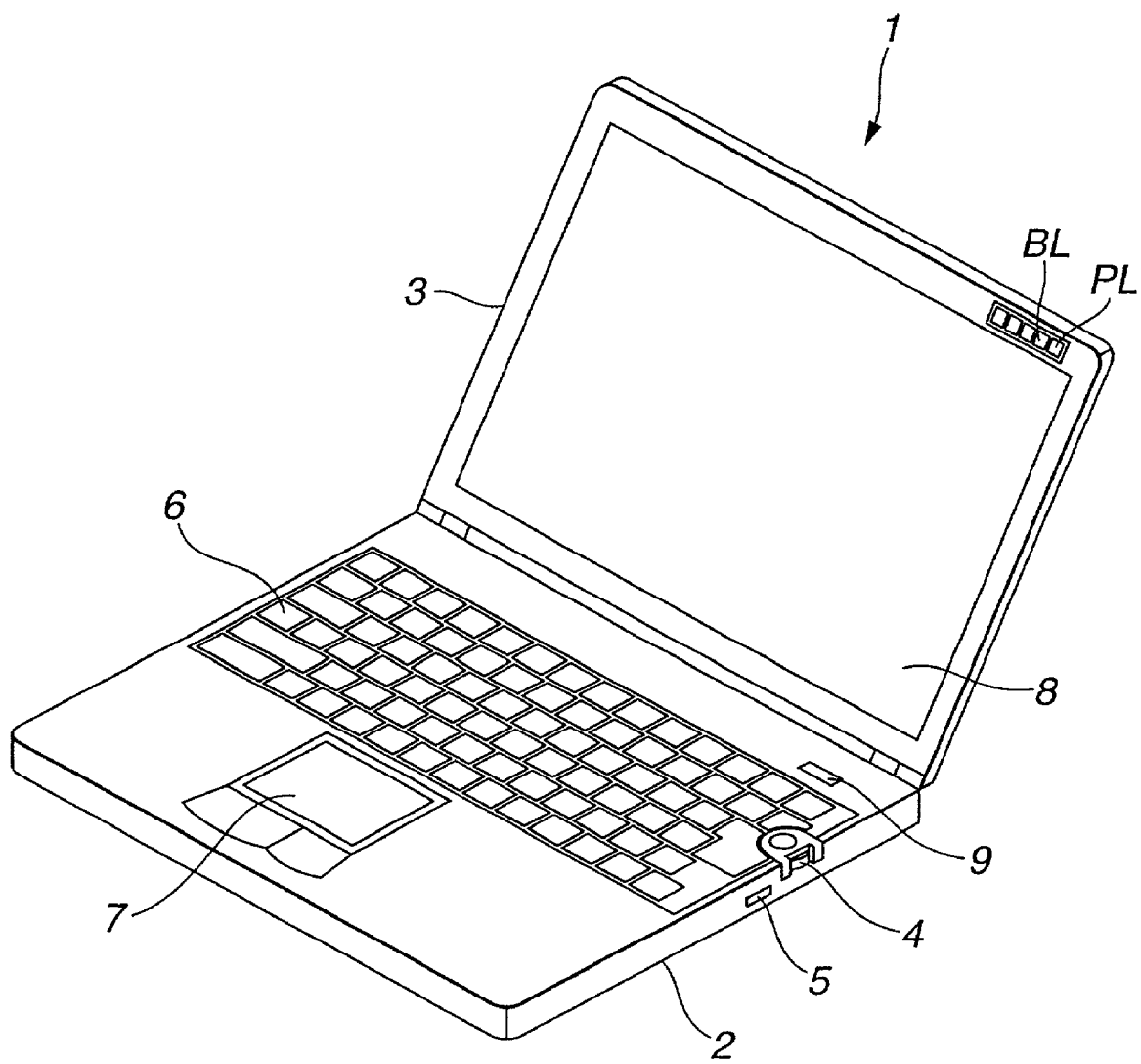
FIG. 13 is a perspective external view of a still another notebook PC in which the present invention is applied.
Figure 14:
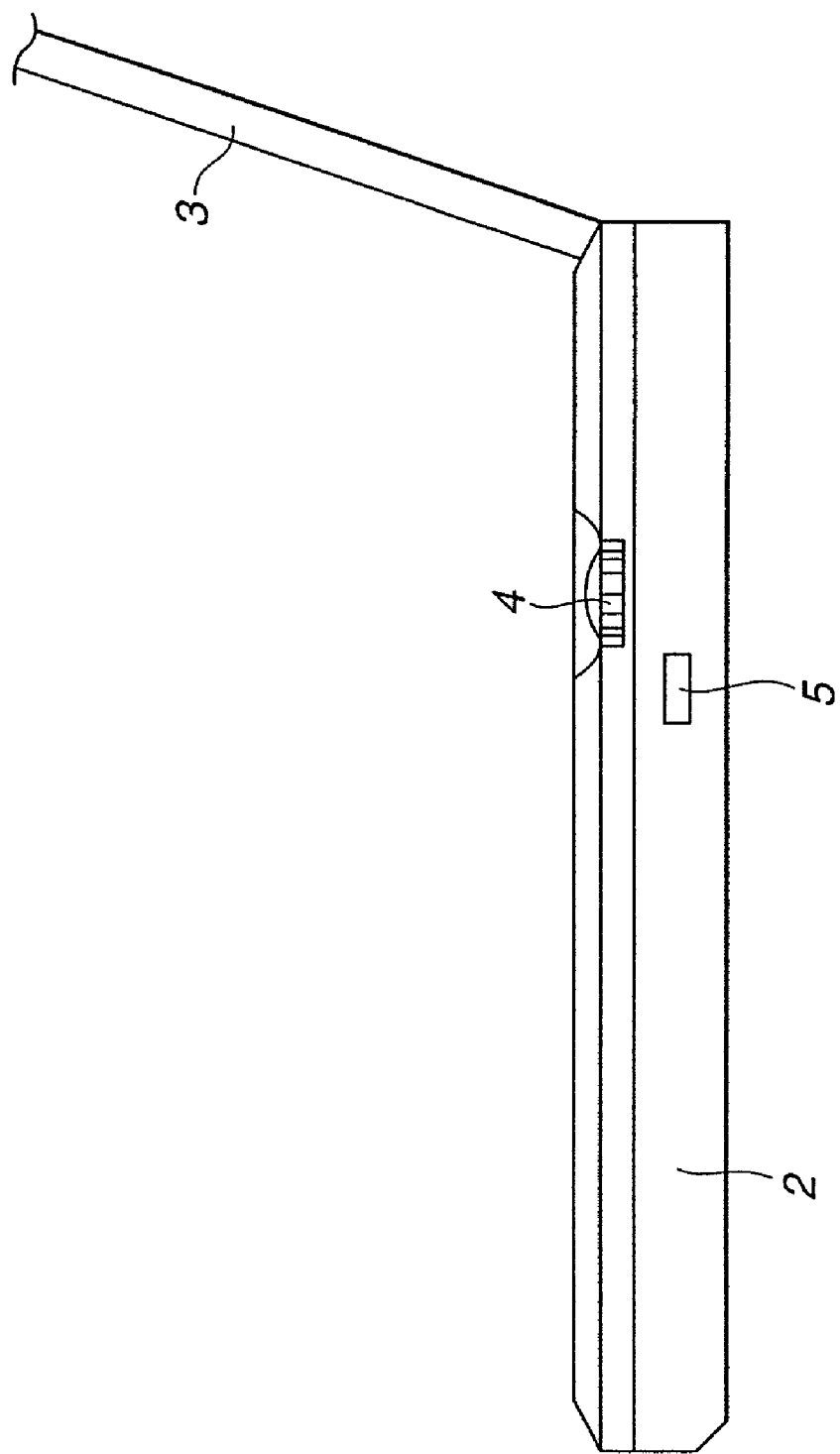
FIG. 14 is a side elevation of the still another notebook PC in FIG. 12.

Note that the present invention is not limited to the above-mentioned location of the jog dial 4 and back button 5 as shown in FIG. 1 but they may be located as shown in FIGS. 11 to 14. More particularly, the jog dial 4 and back button 5 may be located, neighboring each other, at the right inner corner of the body unit 2 as shown in FIGS. 11 and 12. Also, the jog dial 4 may be provided to the right of the keyboard 6 of the body unit 2 while the back button 5 may be located at the right lateral side of the body unit 2 as shown in FIGS. 13 and 14.

Further, it is of course that the jog dial 4 and back button 5 may be provided both at the left lateral side of the body unit 2. Also, they may be located at the front central portion of the body unit 2 so that they can be operated with the thumb while operating the touch pad 7 with the forefinger. Furthermore, the jog dial 4 and back button 5 may be located in any other places. Namely, they may be provided at the left or right lateral side of the display unit 3 on which the LCD 8 is provided. They may be located vertically along the left or right edge of the touch pad 7, or horizontally along the upper or lower edge of the touch pad 7. Alternatively, they may be provided vertically between right and left buttons of the touch pad 7. Further, they may be located vertically between "G" and "H" keys of the keyboard 6. The arranged direction of the jog dial 4 and back button 5 may be limited to neither "vertical" nor "horizontal" but they may be disposed in a direction at such an angle with respect to the "vertical" or "horizontal" direction that they can easily be operated each with a finger. Otherwise, they may be provided at such a lateral side of the mouse (pointing device) that they can be operated with the thumb.

Figure 15:
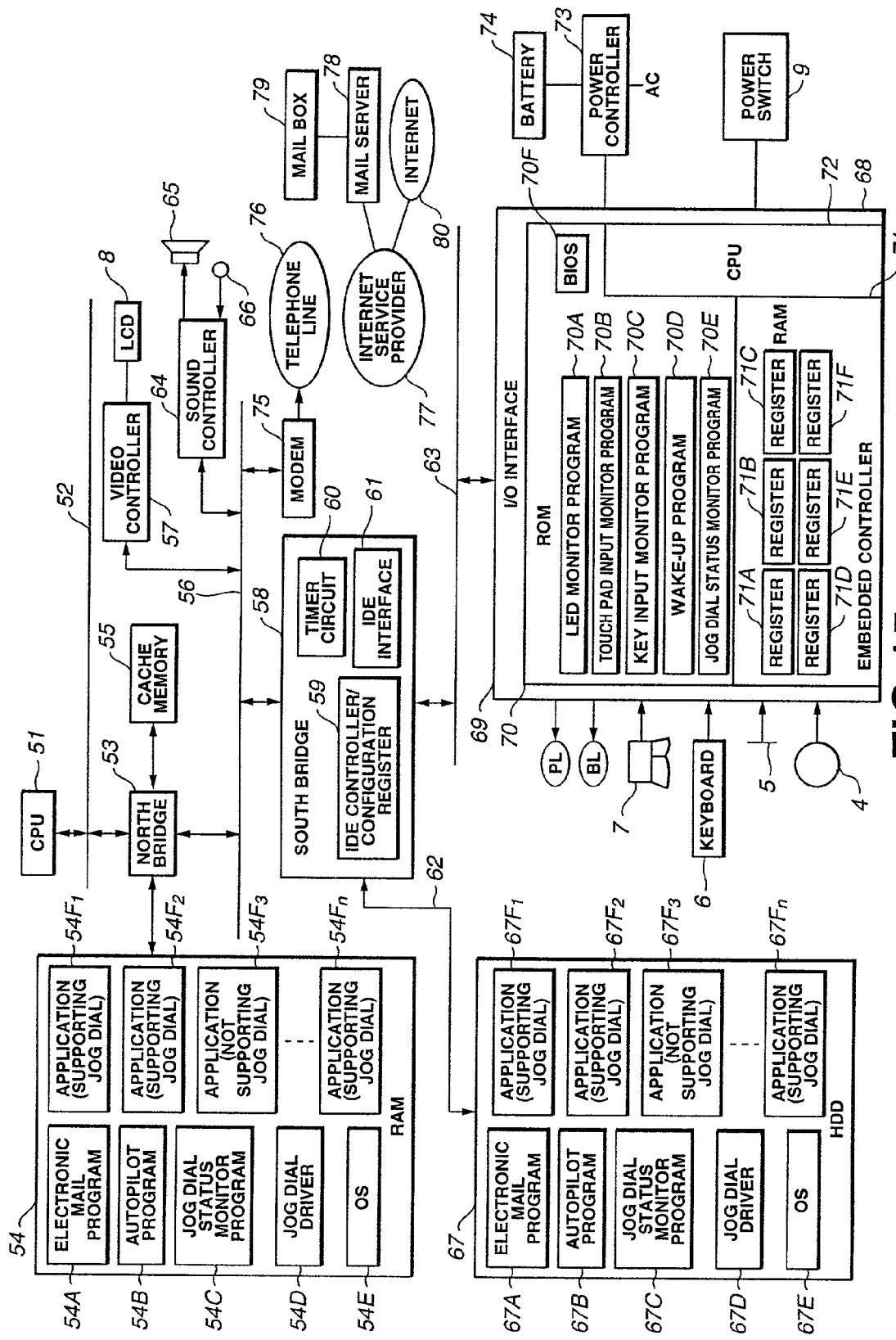
FIG. 15 is an electric circuit diagram of the notebook PC whose appearance is shown in FIG. 1.

Referring now to FIG. 15, there is diagrammatically illustrated an example of the electric circuit of the notebook PC 1. The electric circuit includes a central processing unit (CPU) 51 which is a Pentium (trademark) processor from the Intel for example. The CPU 51 is connected to a host bus 52. The host bus 52 has connected thereto a north bridge 53 which is also connected to a PCI bus 56. The north bridge 53 is formed from 400 BX from the Intel for example. It is provided to control the CPU 51 and a main memory 54. It should be reminded that the north bridge 53 and a south bridge 58 which will further be described later form together a so-called chip set.

The north bridge 53 is further connected to the main memory 54 and a cache memory 55 which is to cache data used in the CPU 51. Also the CPU 51 incorporates a primary cache memory (not shown).

The main memory 54 is a DRAM (dynamic random-access memory) to store programs which are to be executed by the CPU 51 and necessary data for operations of the CPU 51. More specifically, when the notebook PC 1 is booted up, the main memory 54 receives and stores for example an electronic mail program 54A, autopilot program 54B, jog dial status monitoring program 54C, jog dial diver 54D, operating program (OS) 54E and, in addition, application programs $54F_1$ to $54F_n$ transferred from an HDD (hard disc drive) 70.

The electronic mail program 54A transmits and receives (mail) a message to and from a counterpart electronic device (PC or the like) over a network including a communication line such as a telephone line 76 via a modem 75 which will further be described later. The electronic mail program 54A includes an incoming mail acquisition function as a specific function to inquire of a mail server 78 at an Internet service provider 77 if any mail to the user of the notebook PC has arrived at a mail box 79 of the user and acquire a mail if any arrived.

The autopilot program 54B starts a predetermined number of processes (or programs) one after another in a preset order.

The operating program (OS) 54E is the so-called Windows 95 or 98 (trademarks of the Microsoft Corporation) for example or the Mac OS (trademark of the Apple Computer, Inc.) to control the basic operations of a computer.

The jog dial status monitoring program 54C is to receive, from each of the above applications, a notice of whether the application supports the jog dial and back button, and display what can be done by operating the jog dial 4 when the application supports the jog dial and back button. Normally, the jog dial status monitoring program 54C is in a wait status for an event, and has also a list for reception of a notice from an application. The jog dial driver 54D performs a variety of functions in response to operations of the jog dial 4 and back button 5.

The electric circuit of the notebook PC 1 also includes a video controller 57 connected to the PCI bus 56. The video controller 57 controls the display on the LCD 8 of the display unit 3 according to data supplied via the PCI bus 56.

The PCI bus 56 has connected thereto a sound controller 64 which receives an input from a microphone 66 or supplies a sound signal to a speaker 65. It also has connected thereto a modem 75 which can be connected to a communication network 80, mail server 78 or the like such as the Internet via the public telephone line 76 and Internet service provider 77.

Further, the PCI bus 56 has the south bridge 58 connected thereto. The south bridge 58 is formed from PIIX4E from the Intel for example to control various inputs and outputs (I/O). More specifically, the south bridge 58 includes an IDE (integrated drive electronics) controller/configuration register 59, timer circuit 60, IDE interface 61 etc. as shown in FIG. 15. It is adapted to control devices connected to the IDE bus 62. and those connected thereto via an ISA/EIO (Industry Standard Architecture/Extended Input Output) bus 63 and embedded controller 68.

The above IDE controller/configuration register 59 consists of two IDE controllers, primary and secondary. Namely, it includes two IDE controllers, two configuration registers, etc.

The primary IDE controller is connected, via the IDE bus 62, to a connector (not shown) to which an HDD 67 is connected. Also, the secondary IDE controller is adapted to have electrically connected thereto via another IDE bus or the like a connector of a bay device being a so-called IDE device, such as a CD-ROM drive, second HDD, FDD or the like (not shown), if any, installed to the notebook PC.

Note that the HDD 67 has stored therein an electronic mail program 67A, autopilot program 67B, jog dial status monitoring program 67C, jog dial driver 67D and OS (basic program software) 67E as well as a plurality of application programs $67F_1$ to $67F_n$. The programs 67A, 67B, 67C, 67D, 67E, $67F_1$ to $67F_n$, etc. stored in the HDD 67 are sequentially transferred to and stored in a RAM 54 while the notebook PC 1 is being booted up.

The ISA/EIO bus 63 has further connected thereto the embedded controller 68 which is a microcomputer for use as an I/O controller. The embedded controller 68 is composed of an I/O interface 69, ROM 70, RAM 71 and CPU 72 connected to each other.

The ROM 70 has previously stored therein an LED control program 70A, touch pad input monitoring program 70B, key input monitoring program 70C, wake-up program 70D, and a jog dial status monitoring program 70E.

The above LED control program 70A controls the on-off operation of the pilot lamp PL, battery lamp BL, message lamp ML (provided as necessary) and other lamps (LED). The touch pad input monitoring program 70B is to monitor a user input from the touch pad 6. The key input monitoring program 70C monitors an input from the keyboard 5 and other key switches. The wake-up program 70D checks, based on a present-time data supplied from the timer circuit 60 in the south bridge 58, whether a preset time has been reached, and manages various chips to start a predetermined process (or program) or the like when the preset time has been reached.

The jog dial status monitoring program 70E always monitors when the rotary encoder 12 of the jog dial 4 is rotated or pushed, and also monitors when the back button 5 is pushed. This program 70E will further be described later.

The ROM 70 has further BIOS 70F written therein. The BIOS (basic input/output system) refers to a basic input/output system being a software program to control data transfer (input and output) between OS or application software and peripheral devices such as the display, keyboard, HDD or the like.

The RAM 71 incorporates registers 71A to 71F including an LED control register, touch pad input status register, key input status register, preset time register, jog dial status monitoring I/O register, etc. For example, the LED control register 71A controls the on-off operation of the message lamp ML which indicates when pressing the jog dial 4 results in an instantaneous set-up of the electronic mail which will further be described later. The key input status register 71C is adapted to store an operation key flag when the jog dial 4 is pushed for a one-touch operation which will further be described later. The preset time register 71D stores a time arbitrary set.

The embedded controller 68 has connected thereto the jog dial 4, back button 5, keyboard 6 and touch pad 7 by respective connectors (not shown), and is adapted to output to the ISA/EIO bus 63 a signal corresponding to the operation of each of the jog dial 4, back button 5, keyboard 6 and touch pad 7. Also, the embedded controller 68 has connected thereto the pilot lamp PL, battery lamp BL, message lamp ML and other lamps (LED).

The embedded controller 68 has further connected thereto a power control circuit 73 connected to a built-in battery 74 or AC source. Thus, the embedded controller 68 controls the power control circuit 73 to supply a necessary power to each of the blocks and recharge the built-in battery 74 and second batteries in the peripheral devices appropriately. Also, the embedded controller 68 monitors the power switch 9 operated to turn on or off the notebook PC 1.

The embedded controller 68 has an internal power unit, and thus can always execute each of the above programs 70A, 70B, 70C, 70D and 70E even with the power switch 9 turned off. That is, each of these programs is always working while there is displayed no window on the LCD 8 of the display unit 3. More specifically, the embedded controller 68 always executes the jog dial status monitoring program 70E, even while the power switch 9 is off and the OS 54E is not running in the CPU 51, to provide a programmable power key (PPK) function which enables, even during a power saving status or power-off status, to start a desired software or script file only with the jog dial 4 pushed by the user, whereby it is made unnecessary to provide any dedicated key in the notebook PC 1, which however will not be described any more.

Figure 16:
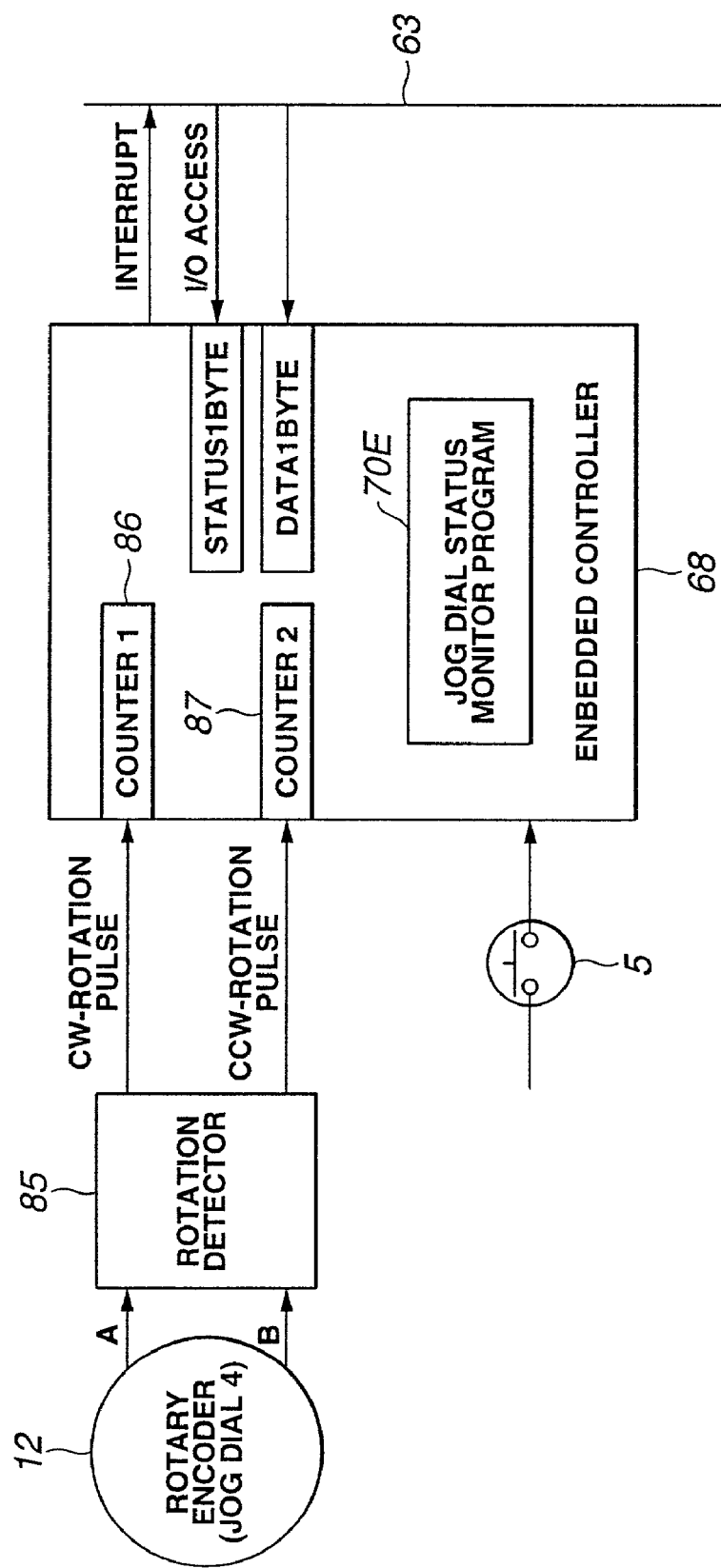
FIG. 16 is a functional block diagram showing monitoring by an embedded controller of the jog dial and a back button.
Figure 17:
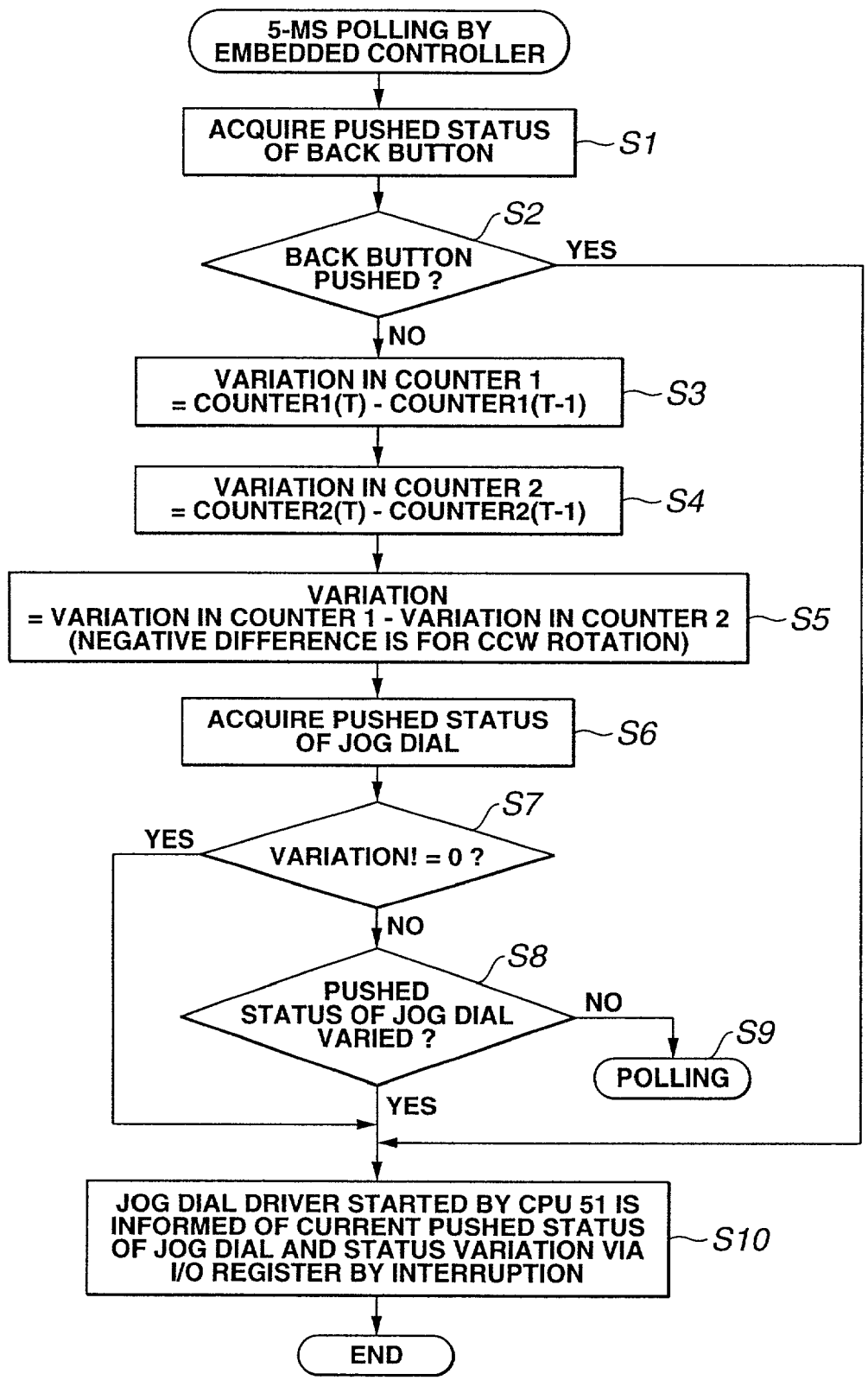
FIG. 17 is a flow chart of operations effected when the embedded controller executes a jog dial status monitoring program.
Figure 18:
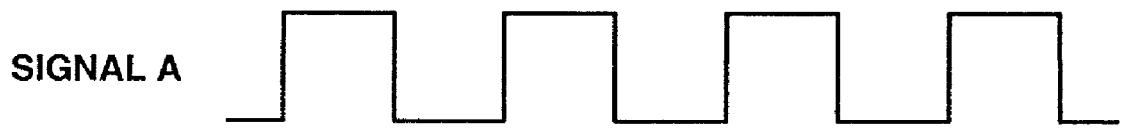
FIG. 18 is a time chart of operations of a rotary detector shown in FIG. 17.
Figure 18:
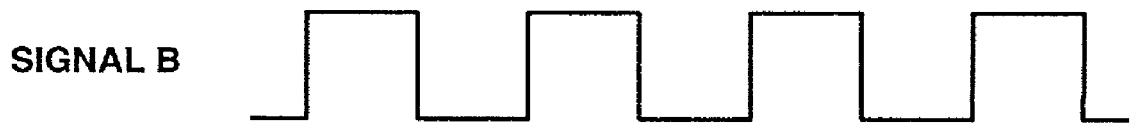
Figure 18:
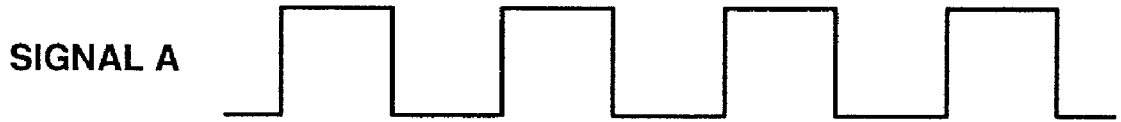
Figure 18:

The embedded controller 68 operates to execute the jog dial status monitoring program 70E as will be described below with reference to FIGS. 16 to 18 in which FIG. 16 shows a hardware constriction in which the embedded controller 68 monitors the status of the rotary encoder 12 of the jog dial 4 via a rotation detector 85 and also the status of the back button 5; FIG. 17 is a flow chart of operations done when the embedded controller 68 executes the jog dial status monitoring program 70E; and FIG. 18 is a time chart of operations of the rotation detector 85 in FIG. 16.

First, the embedded controller 68 checks if the back button 5 is in the pushed status. If the back button 5 is not in the pushed status, the embedded controller 68 detects, via the rotation detector 86, in which direction the rotary encoder 12 of the jog dial 4 has been rotated, clockwise (CW) or counterclockwise (CCW). The rotation detector 85 detects, based on the timing of signals A and B shown in FIG. 18, whether the direction of rotation is CW or CCW. When the direction of rotation is CW, the rotation detector 85 produces a CW-rotation pulse and supplies it to a counter (1) 86 of the embedded controller 68. On the other hand, when the direction of rotation is CCW, the rotation detector 85 produces a CCW-rotation pulse and supplies it to a counter (2) 87 of the embedded controller 68.

More particularly, the embedded controller 68 will first execute the jog dial status monitoring program 70E and acquire the pushed status of the back button 5 by 5-ms polling (in step S1). When it has been judged in step S2 that the back button 5 has been pushed (YES), the embedded controller 68 goes to step S10. However, if it has been judged that the back button 5 has not been pushed (NO), the embedded controller 69 will go to step S3 and subsequent steps.

In step S3, a count "Counter1 (T−1)" of the CW rotation at a time T−1 is subtracted from a count "Counter1 (T)" at a time T to determine a variation "Countre1" of the count in the counter (1) 86.

Next in step S4, a count "Counter1 (T−1)" of the CCW rotation at a time T−1 is subtracted from a count "Counter1 (T)" at a time T to determine a variation "Countre2" of the count in the counter (2) 87.

In step S5, a difference between the variations of the counts, namely, between the variations "Counter1" and "Counter2". When the difference in variation takes a negative value, it means that the jog button 4 has been rotated counterclockwise (CCW).

Further in step S6, the embedded controller 68 acquires the pushed status of the jog dial 4 In step S7, the embedded controller 68 checks the variation determined in step S5. Further in step S8, the embedded controller 68 judges if the pushed status of the jog dial 4 has varied. When the embedded controller 68 has checked the variation in step S7 or has judged in step S8 that the pushed status of the jog dial 4 has varied, it goes to step S10 where it will inform, by interruption, the jog dial driver 54D started by the CPU 51 of the current pushed status of the jog dial 4 and its variation via the I/O register 71F over the host bus 52. The operation effected in step S10 is also applied to the operation of the back button 5 when it has been judged in step S2 that the back button 5 has been pushed. In this case, the embedded controller 68 will inform, by interruption, the jog dial driver 54D started by the CPU 51 of the current pushed status of the back button 5 via the I/O register 71F over the host bus 52.

Figure 19:
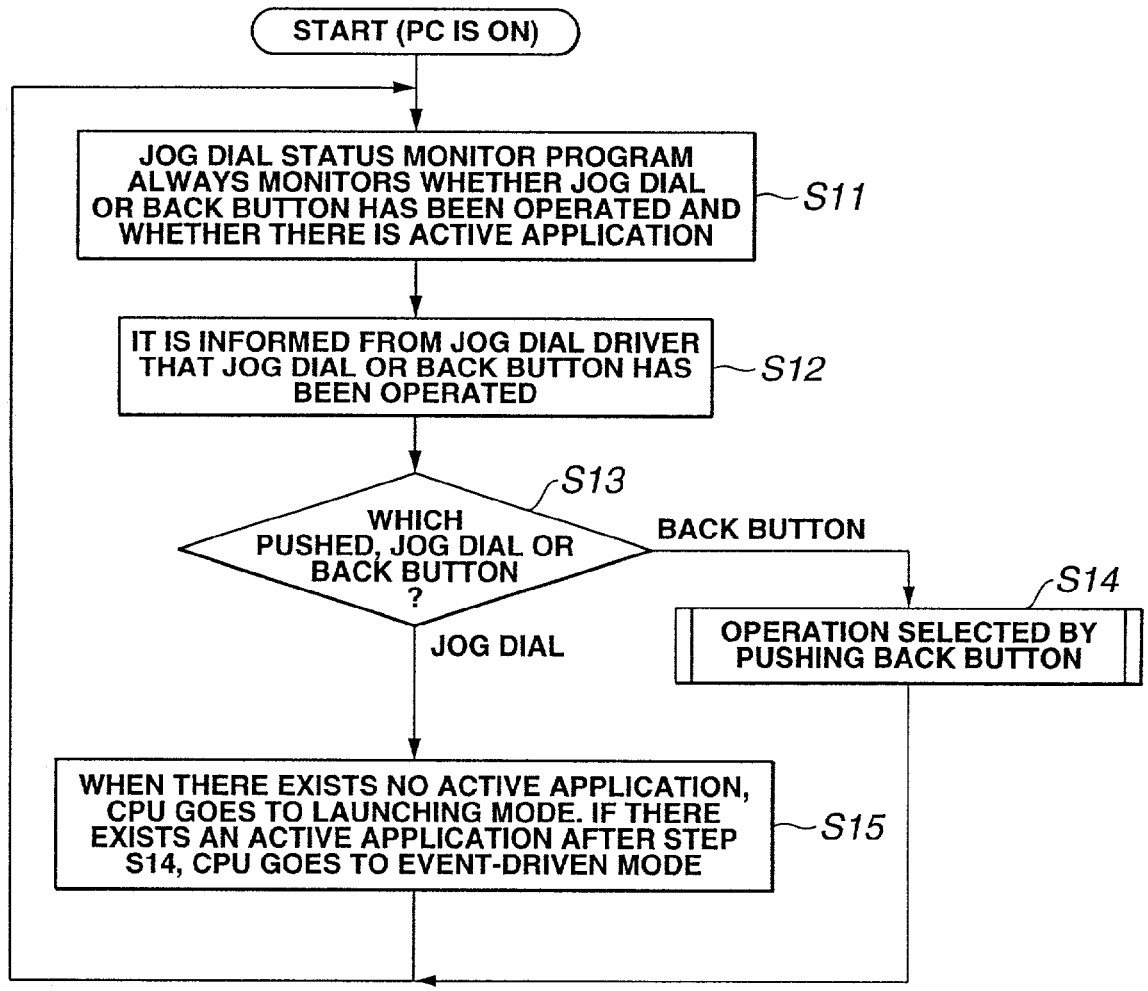

After the power switch 9 is turned on, the CPU 51 will execute the jog dial status monitoring program 54C in a procedure shown in FIG. 19.

First in step S11, the CPU 51 monitors whether the jog dial 4 or back button 5 has been operated. The CPU 51 also monitors whether the electronic mail program 54A or any of the other applications $54F_1$ to $54F_n$ is activated. The monitoring of the status of the jog dial 4 or back button 5 is intended for the CPU 51 to monitor the operation of the jog dial status monitoring program 70E via the jog dial driver 54D.

When the CPU 51 is informed, in step S12, from the jog dial driver 54D that the jog dial 4 or back button 5 has been operated, it will go to step S13 where it will judge whether the jog dial 4 or back button 5 has been pushed.

If it has been judged instep S13 that the back button 5 has been pushed and the CPU 51 has been informed of the judgment, the CPU 51 will make an operation selected by pushing the back button 5 in step S14. The operation selected by pushing the back button 5 will further be described later with reference to FIG. 23.

If it has been judged in step S13 that the jog dial 4 has been pushed and the CPU 51 has been informed of the judgment, the CPU 51 will judge, in step S15, whether there exists any active application. When there is no active application, the CPU 51 goes to a launching mode of operation. On the other hand, when there is an active application, the CPU 51 will go to an event-driven mode of operation. The "launching" used herein refers to an operation to select a selected one of registered applications.

The launching mode of operation becomes valid when there exists no active application as mentioned in the above. FIG. 20 shows examples of a jog dial window 90 in which applications to be launched by the jog dial 4 are displayed for selection.

Figure 20A:
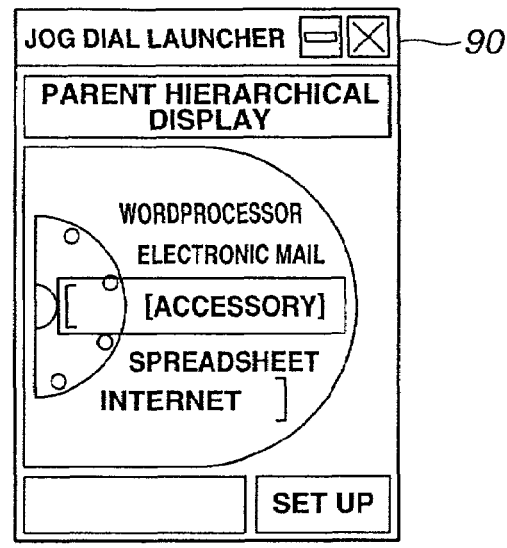
FIG. 20 shows a jog-dial window in detail.
Figure 20B:
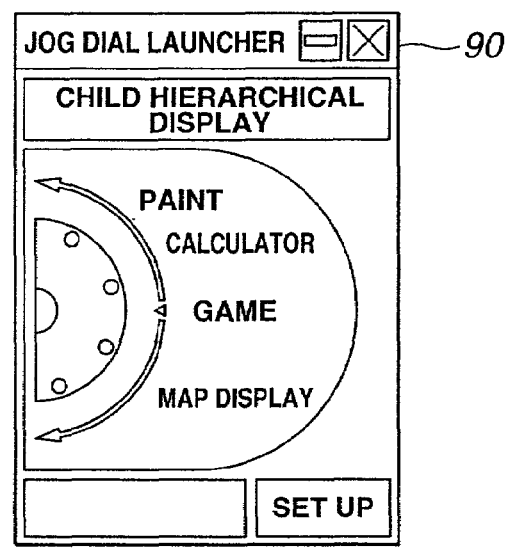

FIG. 20A shows an example of the jog dial window 90 in which names of applications pre-registered in the launching mode such as "Wordprocessor", "Electronic mail", "Accessory", "Spreadsheet" and "Internet browser" are displayed in a parent hierarchy. When the "Accessory" is selected from the parent hierarchical display by rotating (scrolling) and pushing the jog dial 4, items "Event", "Calculator", "Game", "Map display", etc. being submenu of the "Accessory" are displayed in a child hierarchy as shown in FIG. 20B. An application program can be selected for execution by rotating and pushing the jog dial 4 from the child hierarchical display.

When the launching mode of operation is thus set up, the jog dial window 90 indicating the launching mode is displayed on the LCD 8. The jog dial window 90 displays a list of applications to be launched by an upward or downward rotation (scroll) and pushing of the jog dial 4.

For example, assume here that the CPU 51 has been put in run by the predetermined OS 54E, no application is active and the user has pushed the jog dial 4 once in the direction of arrow b in FIG. 3. In this case, as having been described with reference to FIGS. 15 to 18, the jog dial driver 54D will receive the pushed status of the jog dial 4 by an interruption for sending a flag status via the I/O register in step S7 in FIG. 17. Thus, the jog dial driver 54D will send, to the jog dial status monitoring program 54C executed by the same CPU 51, a notice that the jog dial 4 has been operated as in the above.

Then, a list of application software pre-registered in the launcher list and supporting the jog dial is displayed as shown in FIG. 20.

In step S15 in FIG. 19, the CPU 51 goes to the even driving mode of operation when there is any active application. The "event-driven mode of operation" will be set up when the CPU 51 has executed the jog dial status monitoring program 54C after the power switch 9 is turned on and there is an active application in step S15 in FIG. 19. The active application should be a one which can support the jog dia, for example, an application "Map display".

Figure 20C:
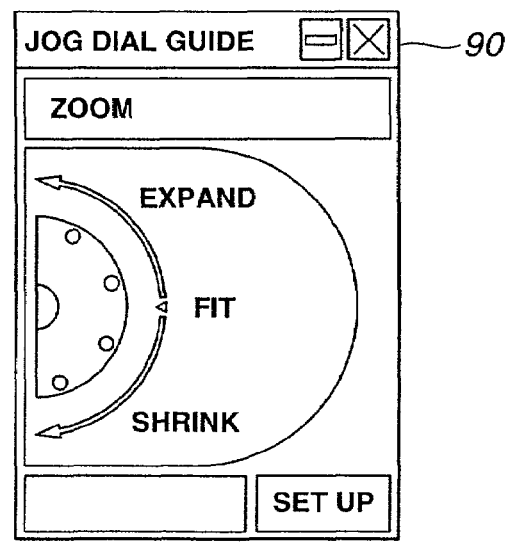
Figure 21:
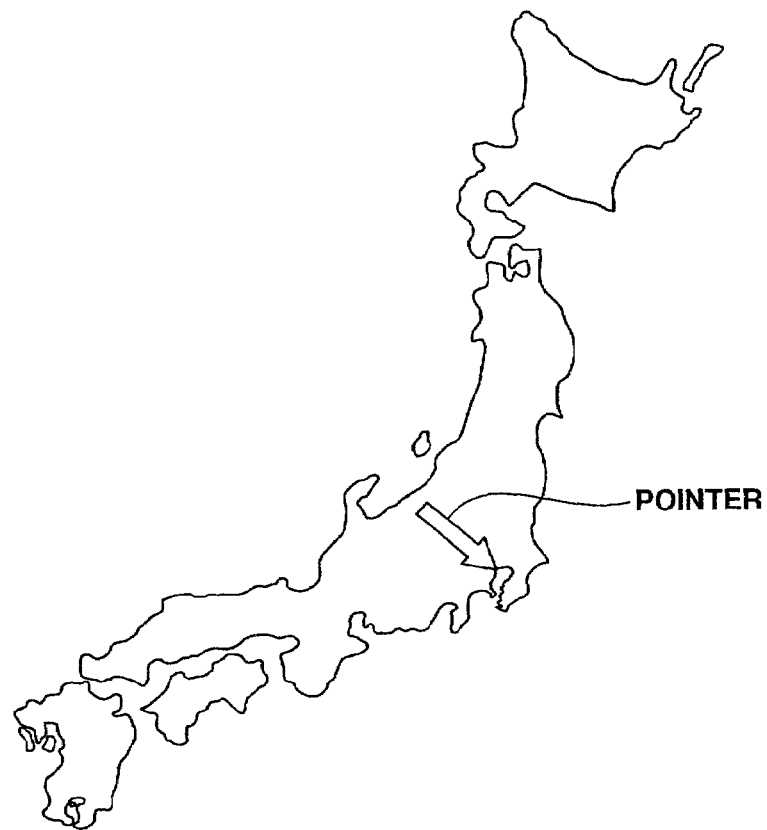
FIG. 21 shows an example of the display by a map-display application program.
Figure 22:
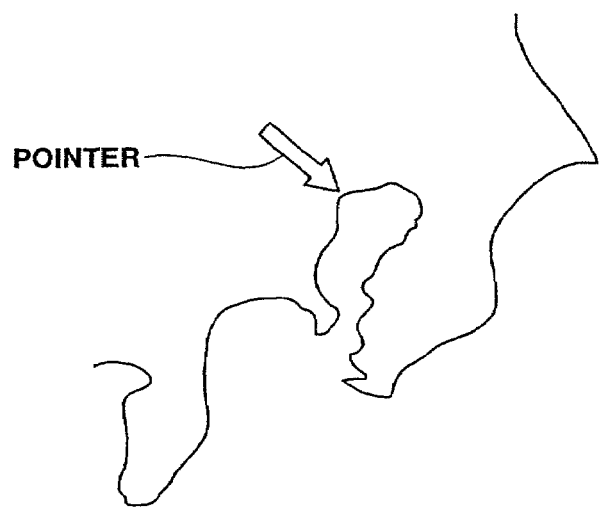
FIG. 22 shows another example of the display by the map-display application program.

In this example, it is assumed that a map of Japan as shown in FIG. 21 is displayed on the LCD 8 under the application program. At this time, the jog dial window 90 showing a guided status of the jog dial ("JOG DIAL GUIDE") as in FIG. 20C is displayed on the LCD 8. As the user rotates the jog dial 4 with the "JOG DIAL GUIDE" displayed in the jog dial window 90, the map image will be expanded around a spot pointed by a pointer as shown in FIG. 22. On the other hand, by rotating the jog dial 4 in an opposite direction to that for expansion of the image, the image will be shrunk (to the initial status). In this way, under a predetermined application program supporting the jog dial and having an image display function, an image displayed on the LCD 8 can be expanded or shrunk as selected by rotating the jog dial 4.

Figure 23:
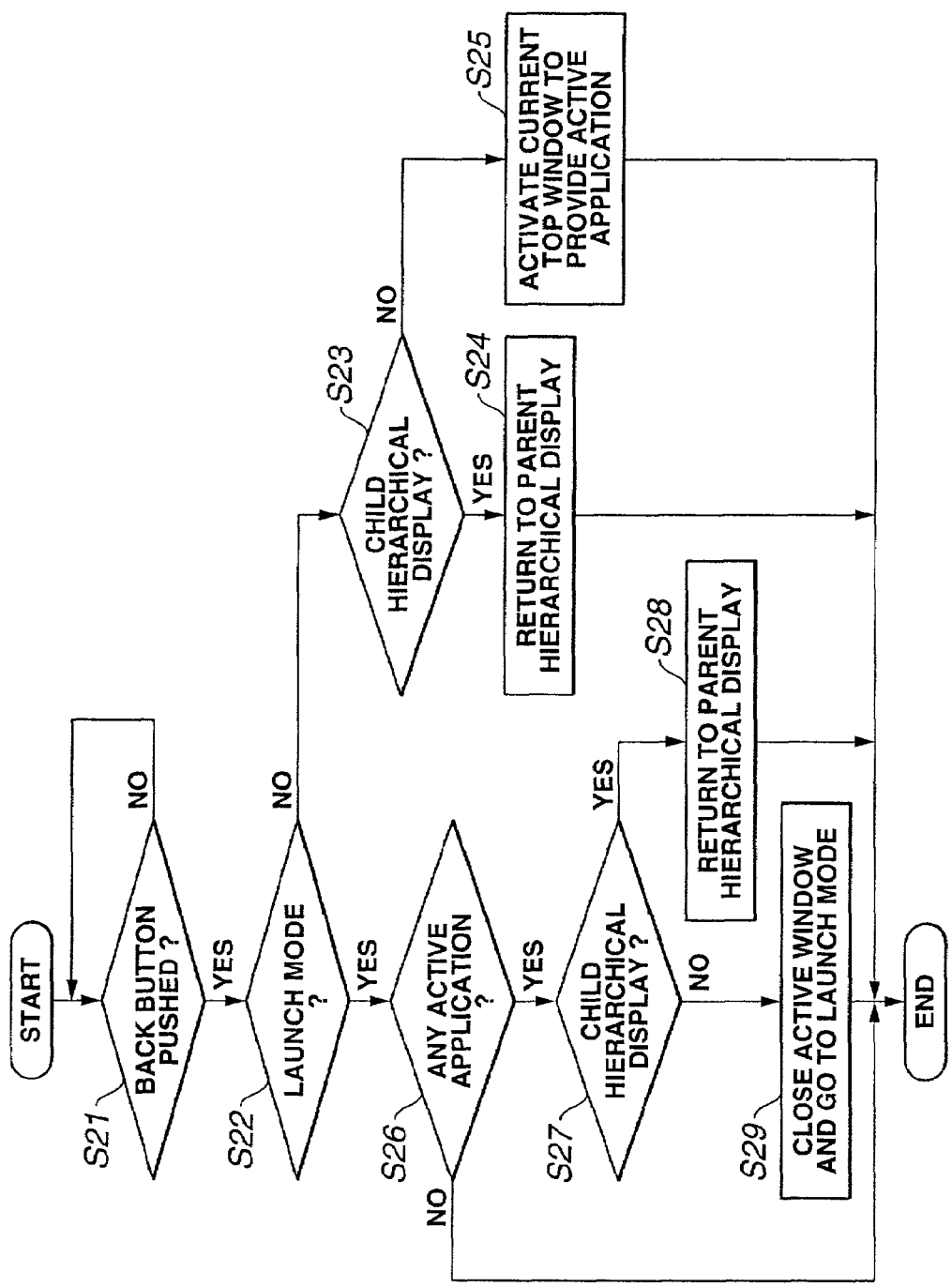
FIG. 23 is a flow chart of operations effected when the back button is pressed.

Next, the operation effected in step S14 in FIG. 19, that is, an operation selected by pushing the back button, will be described in detail with reference to a flow chart in. FIG. 23.

When it is judged in step S21 that the back button 5 has been pushed, the CPU 51 will go to step S22 and subsequent steps. In step S22, the CPU 51 judges whether the launching mode has already been set up or not. If the launching mode of operation has been set up (YES), the CPU 51 goes to step S23 where it will judge whether or not applications are displayed in the child hierarchy.

If the CPU 51 has judged in step S23 that the applications are displayed in the child hierarchy, it will go to step S24 since it has already judged in step S21 that the back button 5 has been pushed where the application display returns to the parent hierarchical display as shown in FIG. 20A for example. On the other hand, if the CPU 51 has judged in step S23 that the applications are not displayed in the child hierarchy (NO), it will go to step S25 where it will activate a current top window to provide an active application.

When the CPU 51 judges in step S22 that the launching mode is not set up (NO), the CPU 51 goes to step S26 where it will judge whether there is any active application. If the CPU 51 judges that there exists an active application, it goes to step S27 where it will judge whether applications are displayed in the child hierarchy. The "child hierarchical" display is a child hierarchical display of jog dial guides. If the display as in FIG. 20C, namely, the guide display for "Expand" or "Shrink" in "Zoom" is a parent hierarchical display, guides for detailed scales for "Expand" or "Shrink" should be displayed in the child hierarchy.

When the CPU 51 has judged in step S27 that the applications are displayed in the child hierarchy (YES), it goes to step S28 where the applications are displayed in the parent hierarchy again. On the other hand, if the CPU 51 has judged in step S27 that the applications are not displayed in the chile hierarchy (NO), it goes to step S29 where the active window will be closed and the launching mode be set up.

As having been described in the foregoing, in the embodiment of the present invention, the back button 5 is newly added for use with the jog dial 4 to enable to undo an operation set by pushing the jog dial 4 without having to reverse the last change by any other key and undo the last change by a combination of the rotation and pushing of the jog dial 4.

Figure 24:
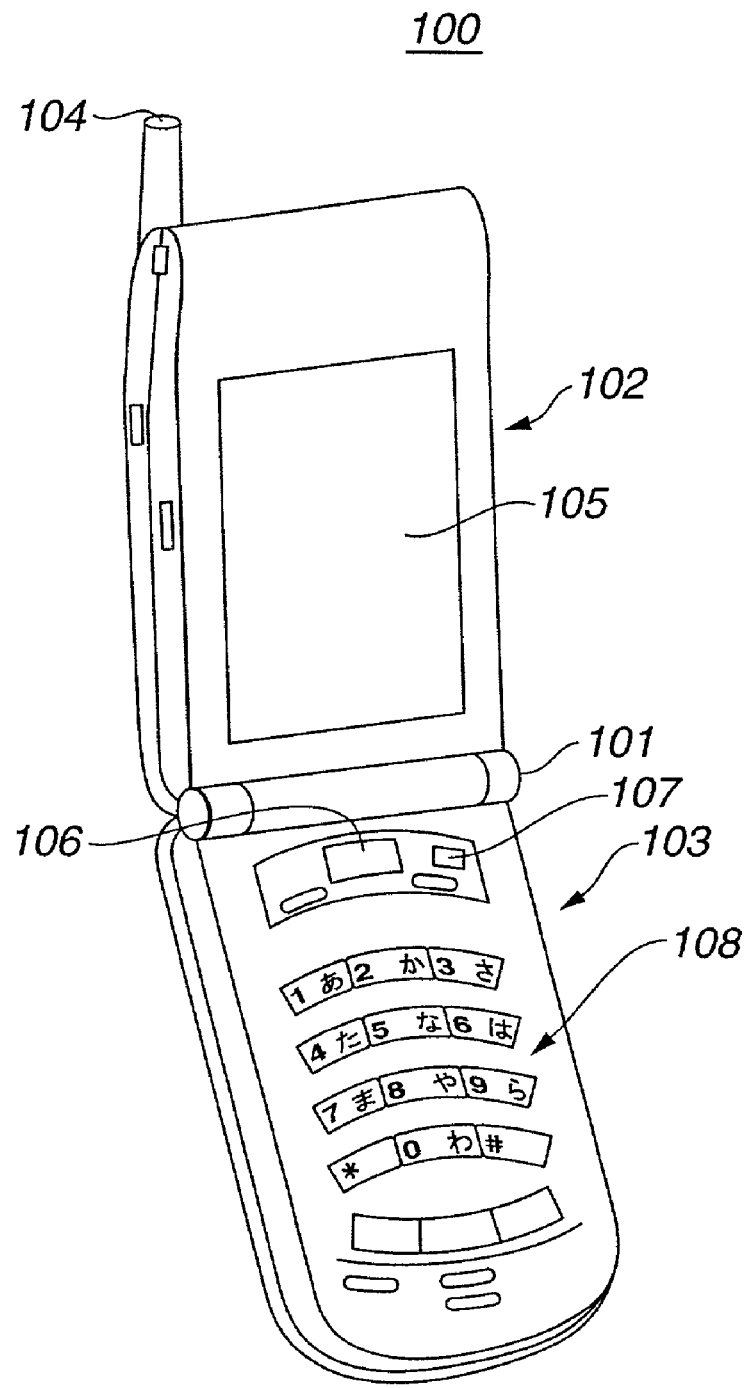
FIG. 24 shows an appearance of a mobile telephone which is a second embodiment of the present invention.

Note that the information processor according to the present invention cannot only be applied to the aforementioned notebook PC 1 but also to a mobile telephone 100 and personal digital assistant (PDA) 110, which may be embodiments of the present invention, as shown in FIGS. 24 and 25, respectively.

As shown in FIG. 24, the mobile telephone 100 as the second embodiment of the present invention is of a type including mainly a display unit 102 and a body unit 103 and in which the display unit 102 is pivotable about a rotating shaft 101 of the body unit 103. An antenna 104 is provided at the upper left of the display unit 102, and an LCD 105 is provided in the center of the display unit 102. Control keys 108 are disposed in the middle of the body unit 103 and a jog dial 106 is provided at the upper portion of the body unit 103. Also, a back button 107 is provided in the vicinity of the jog dial 106 as shown.

This jog dial 106 can be rotated and pushed similarly to the hog dial 4 included in the first embodiment having been described in the foregoing. The back button 107 undoes an operation once done by pushing the jog dial 106 (first operating means). For example, an operation for recalling a registered telephone number, once done by pushing the jog dial 106, can be undone by pushing the back button 107.

Next, the personal digital assistant (PDA) 110 being the third embodiment of the present invention will be described with reference to FIG. 25. FIG. 25D is a top view of the PDA 110. The PDA 110 has formed in the top thereof two memory slots 116 in which memory cards can be inserted respectively. The PDA 110 can record and play back various data including computer data, music data, voice data, moving image data, still image data, control data, etc. to and from a memory card inserted in the memory slot 116. Since the PDA 110 has two memory slots 116, two memory cards can simultaneously be inserted in them. Note however that there may of course be provided a single memory slot or three or more memory slots in the PDA 110.

FIG. 25A is a plan view of the PDA 110. As shown, the PDA 110 has a display screen 111 made of a LCD panel which displays images for start-up of application software and various operations, image and characters as data, information incidental to voice and music to be played back, operation guide message, message for playback and edition operations, etc.

The PDA 110 has controls 114a and 114b for operation by the user, and also a speaker/imaging unit 115.

Further, the PDA 110 has a jog dial 124 and back button 127 provided at the left lateral side thereof The back button 127 undoes an operation once done by pushing the jog dial 124.

Also, the PDA 110 has various terminals for connection to various devices. For example, the PDA 110 is provided with a headphone terminal 120, line output terminal 122, line input terminal 121, etc. as shown in FIG. 25B, and in addition, an IEEE 1394 terminal 125, USB terminal 126, etc. as shown in FIG. 25C.

Next, a notebook personal computer (PC) being the fourth embodiment in which the information processor, information processing method and information processing program according to the present invention are applied, will be described with reference to FIGS. 26 to 34.

The notebook PC is generally indicated with a reference NP. The notebook PC NP is constructed generally the same as the notebook PC 1 shown in FIG. 1 except that the jog dial 4 is provided in a different position and no back button is provided.

Figure 26:
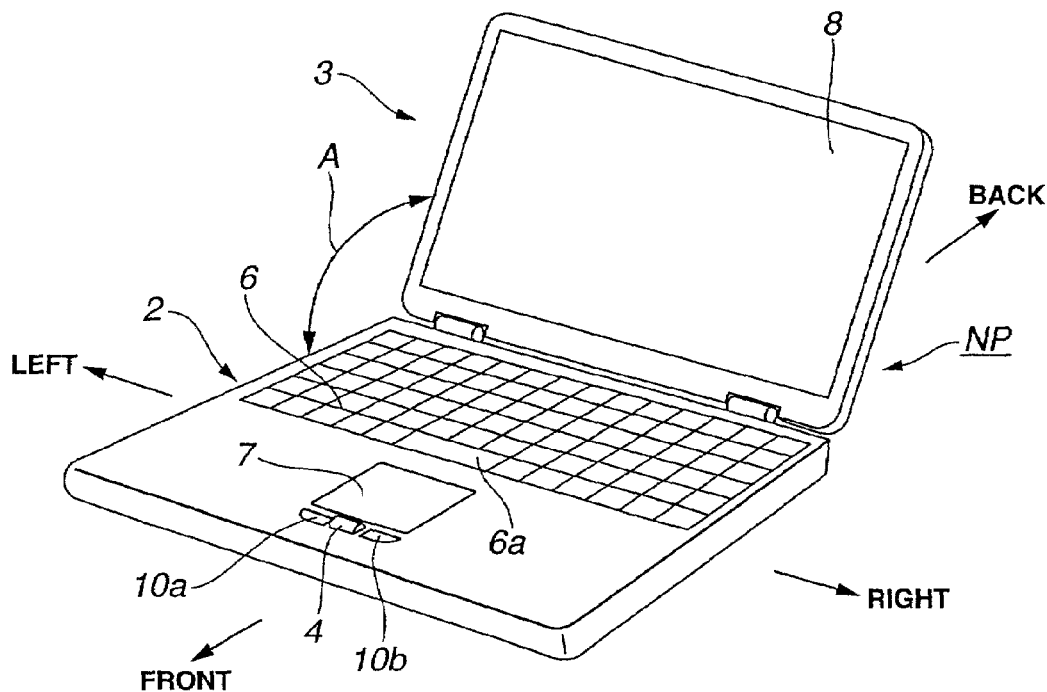
FIG. 26 shows an appearance of a notebook PC which is a fourth embodiment of the present invention.
Figure 27:
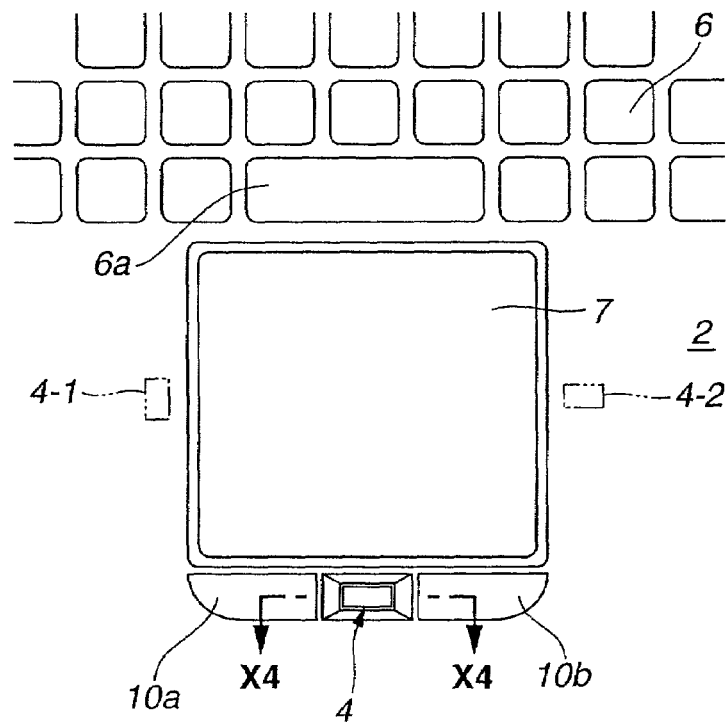
FIG. 27 is a plan view of the notebook PC which is the fourth embodiment of the present invention, showing essential portions as enlarged in scale.

As shown in FIG. 26, the body unit 2 has a touch pad 7, left click button 10a and a right click button 10b disposed on the upper side thereof, more specifically, on a palm rest to this side of the keyboard 6. As best seen from FIG. 27, the touch pad 7 is generally square, and located generally in the intermediate position between the right and left ends of the body unit 2 and near the keyboard 6. More particularly, the rear edge of the touch pad 7 extending along the front edge of the keyboard 6 is located near a space key 6a which is the most frequently used one of the keys included in the keyboard 6. The left and right click buttons 10a and 10b are located to this side of, and near, the touch pad 7 so that they are generally in the intermediate position between the right and left ends of the body unit 2. They are disposed in series in the horizontal direction of the body unit 2. Note that the touch pad 7 is a pointing device as well known.

The left and right click buttons 10a and 10b are disposed with some space between them in the horizontal direction. The jog dial 4 is provided in the space between the right and left click buttons 10a and 10b. Thus, the left click button 10a, jog dial 4 and right click button 10b are disposed in series in the horizontal direction of the body unit 2, and the jog dial 4 is nearer to the left and right click buttons 10a and 10b and also to the touch pad 7.

The jog dial 4 includes a rotor extending longitudinally in the horizontal direction of the body unit 2, and a portion thereof is projecting somewhat above the palm rest. Namely, the rotor has an axis extending horizontally of the body unit 2 and in parallel to the upper side of the body unit 2. Thus, the rotor is rotatable forward and backward about the axis, that is, to this and that sides of the user. Also, the rotor can be pushed down. Note that in FIG. 27, a reference 4-1 or 4-2 indicates the jog dial 4 disposed in a different position, respectively.

In the jog dial 4, the rotor can be rotated forward and backward, and pushed. Namely, the jog dial 4 has three basic thee elements of displacement. In addition to these elements of displacement, the jog dial 4 can have rotation quantities in each of rotating directions and rotation speeds calculated from the rotation quantities. Namely, because of many kinds of modes of operation the rotor can thus have, the operability of the notebook PC NP can considerably be improved by such kinds of modes of operation to functions thereof.

When the user makes inputs from the keyboard 6 with his right and left wrists supported on the palm rest, he or she will touch the touch pad 7 and left and right click buttons 10a and 10b by the fingertip. Since the rotor of the jog dial 4 is located near the touch pad 7 and also the left and right click buttons 10a and 10b, the user can rotate or push the rotor with the forefinger or thumb tip for example without having to move his hand so much in making inputs from the keyboard 6. Namely, the rotor can be operated very easily. In addition, since the rotor of the jog dial 4 is located generally in the intermediate position between the right and left ends of the body unit 2, the user can operate the rotor always with his dominant hand whether he is right-or left-handed, which is more advantageous for an improved operability of the rotor of the jog dial 4.

Figure 28:
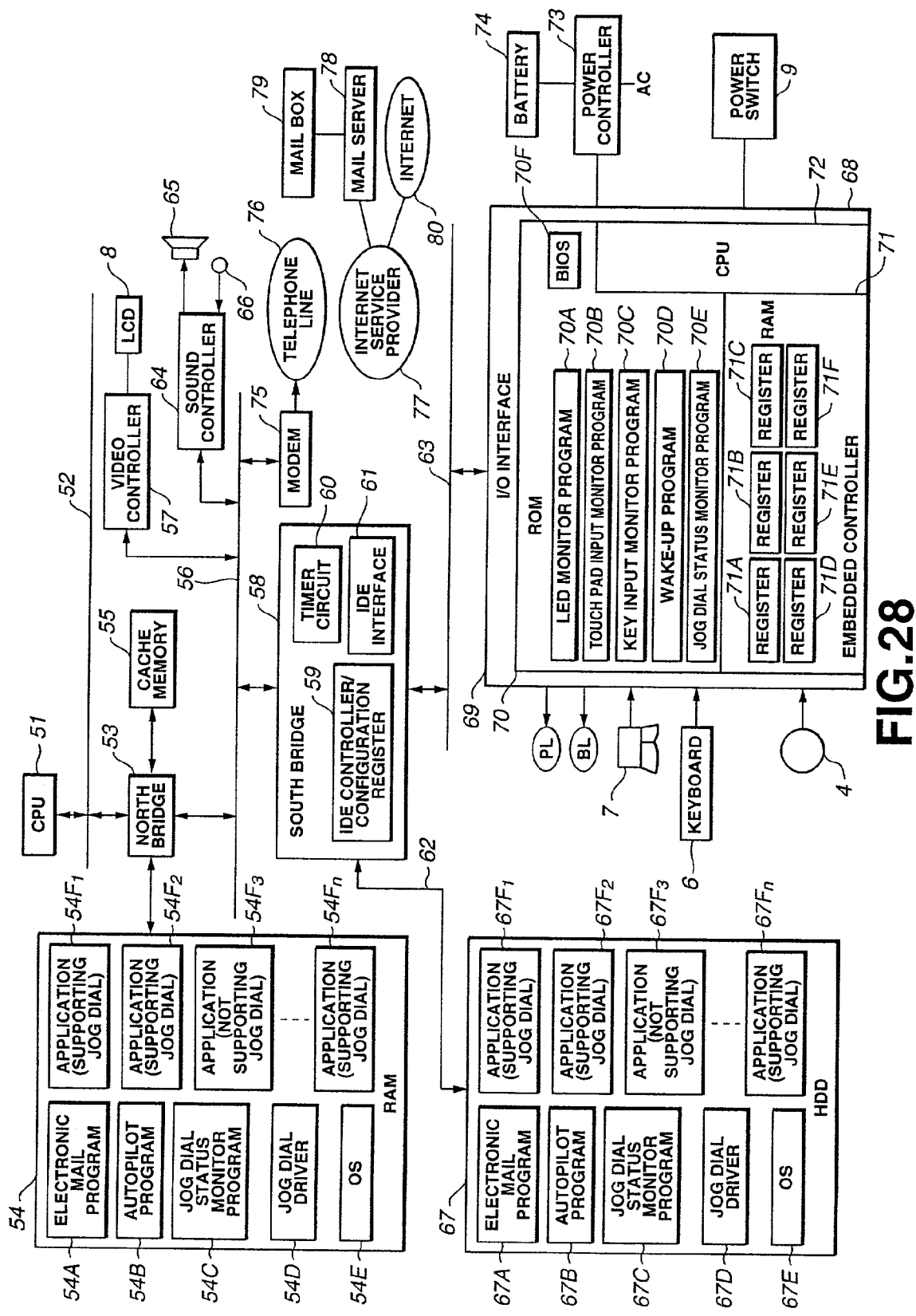
FIG. 28 shows an example of the electric circuit construction of the notebook PC which is the fourth embodiment of the present invention.

Referring now to FIG. 28, there is diagrammatically illustrated an example of the electric circuit of the notebook PC NP. This electric circuit is the same as that in the first embodiment shown in FIG. 15 except that there is no back button. So, the circuit will not be described any more.

Figure 29:
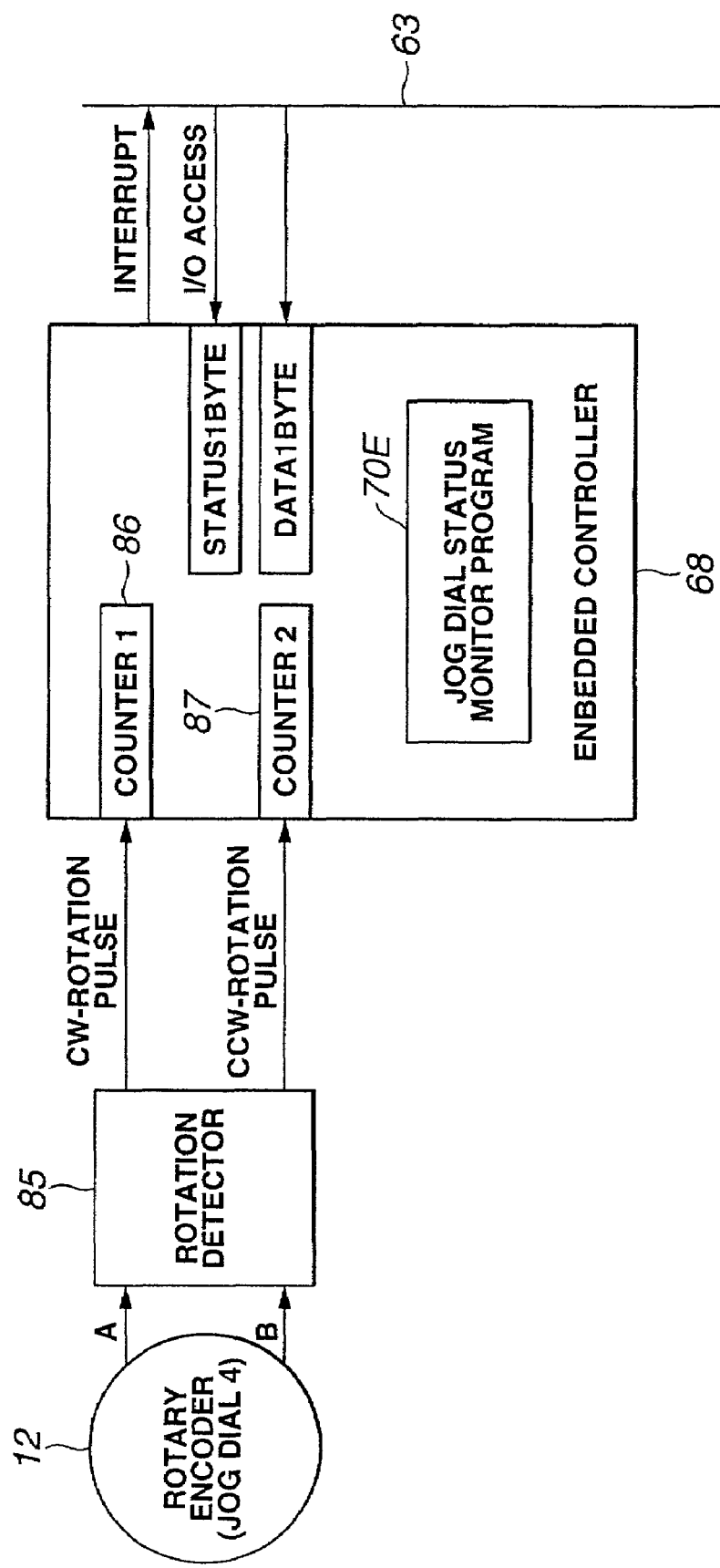
FIG. 29 is a functional block diagram of monitoring by an embedded controller of a jog dial, in the notebook PC which is the fourth embodiment of the present invention.

FIG. 29 shows the functional blocks with which the embedded controller 68 execute the jog dial status monitoring program 70E. However, they are the same as that shown in FIG. 16 except that there are no back button and connecting lines for it.

The embedded controller 68 monitors whether the jog dial 4 has been rotated or pushed as in the flow chart shown in FIG. 17. The embedded controller 68 will pass the result of monitoring to the CPU 51.

Figure 30:
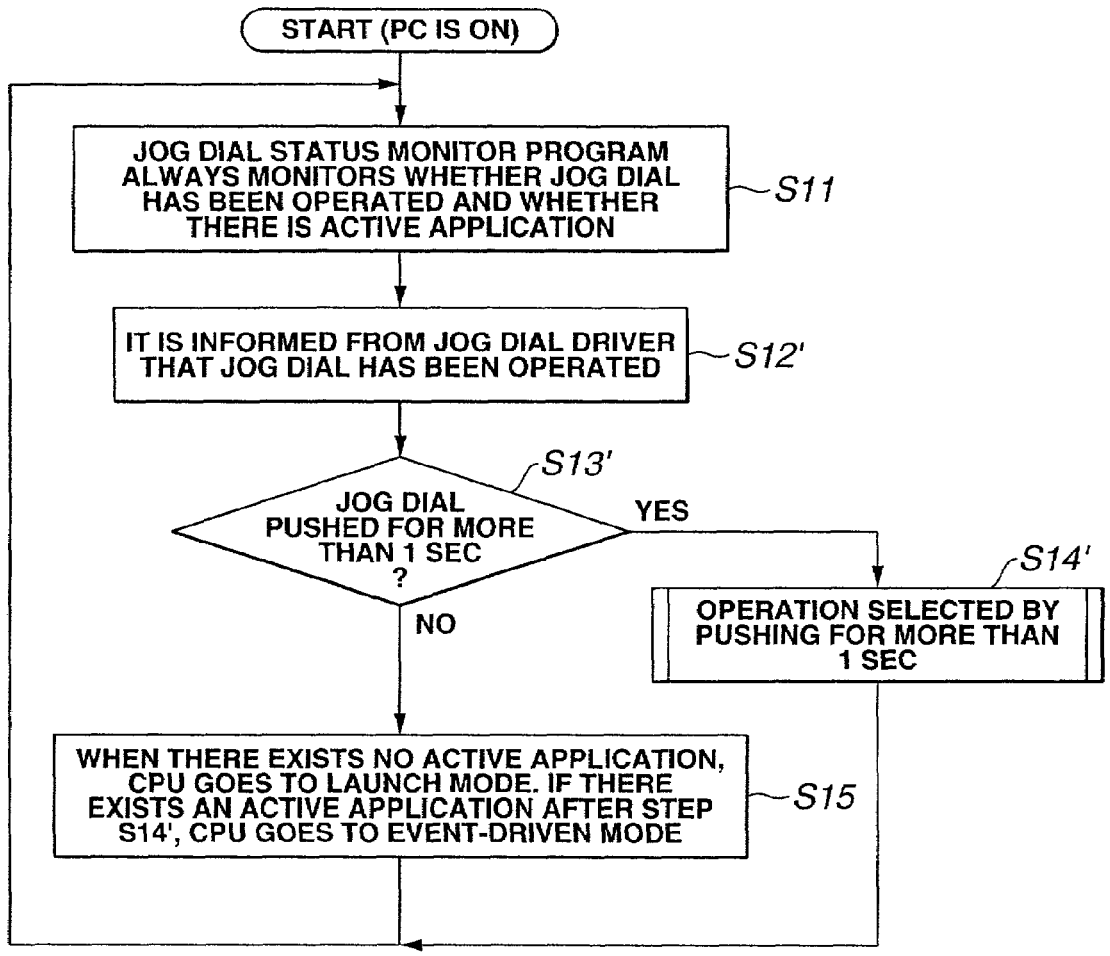

After the power switch 9 is turned on, the CPU 51 will execute the jog dial status monitoring program 54C in a procedure shown in the flow chart in FIG. 30.

In step S11, under the jog dial status monitoring program 54E, it is always monitored whether the jog dial 4 has been operated. Also, it is monitored whether the electronic mail program 54A and any of the applications 54F$_1$ to 54F$_n$ have been activated. Namely, to monitor the status of the jog dial 4, the CPU 51 is formed of a result of monitoring from the jog dial status monitoring program 70E via the jog dial driver 54D.

When the CPU 51 is informed in step S12, from the jog dial driver 54D, that the jog dial 4 has been operated, it goes to step S13' where it will judge whether the jog dial 4 has been pushed for a time longer than a predetermined time. For example, the predetermined time is 1 sec.

In step S14', the CPU 51 being informed from step S13 that the jog dial 4 has been pushed for more than 1 sec, will make an operation corresponding to the judgment. This operation will further be described later with reference to FIG. 31.

In step S15, the CPU 51 being informed from step S13 that the jog dial 4 has been pushed for more than 1 sec, judges whether there exists any active application. If there is no active application, the CPU 51 goes to the launching mode of operation. On the other hand, if there is any active application, the CPU 51 will got to the event-driven mode of operation. The "launching" refers herein to an operation to activate a selected one of registered applications.

The launching mode of operation "DIAL JOG LAUNCHER" will be valid only when there is no active application as in the above. FIG. 32 shows examples of the jog dial window in which applications to be launched by the jog dial are displayed for selection. In this example of the launching mode, a strip-shaped display area like a scroll parchment or papyrus is extended upward in a direction which .is visually the same as the rotated direction of the jog dial 4. The right and left ends of the display area move as if the display area were scrolled. When the strip-like display area has come to the upper end, it will not go any more upward. The jog dial guides are similarly displayed.

Figure 32A:
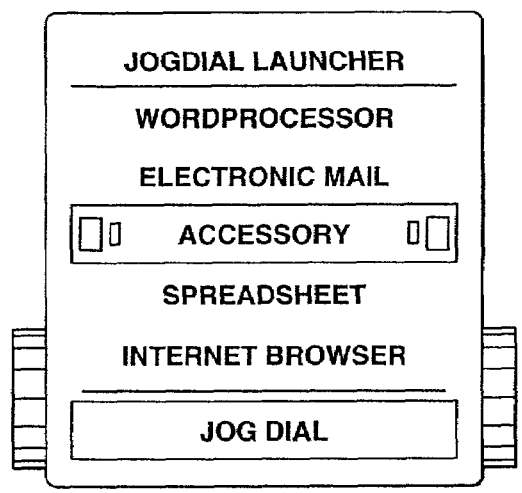
FIG. 32 shows examples of the display by a graphical user interface.
Figure 32B:
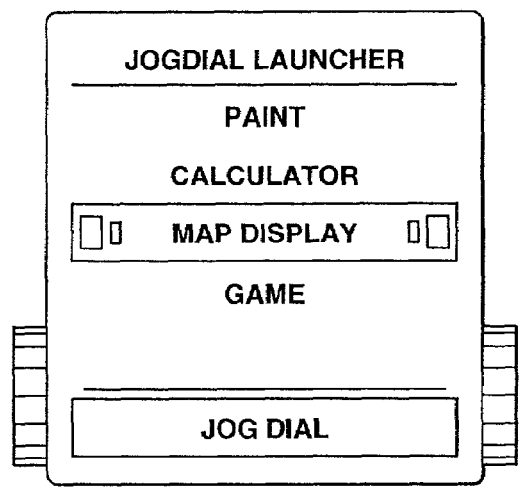

FIG. 32A shows applications pre-registered for launching, including items "Wordprocessor", "Mail", "Accessory", "Spreadsheet", "Internet browser", etc. displayed in a parent hierarchy. When for example "Accessory" is selected from the parent hierarchical display by rotating (scrolling) and pushing the jog dial 4, a submenu of the "Accessory" including items "Paint", "Calculator", "Game", "Map display", etc. are displayed in a child hierarchy as in FIG. 32B. The user can select, for execution, a desired one of the applications from the child hierarchical display by rotating and pushing the jog dial 4.

When the launching is done, a jog dial window indicating of the launching mode is displayed on the LCD 8. The jog dial window displays a list of jog dial-supporting applications to be launched correspondingly to vertical rotation (scrolling) and pushing of the jog dial 4.

Assume here for example that the predetermined OS 54E is started up in the CPU 51, there is no activated application and the user has pushed the jog dial 4 for a time shorter than a predetermined length of time. The jog dial driver 54D will receive the pushed status of the jog dial 4 by an interruption for sending a flag status via the I/O register in step S7 in FIG. 17. Thus, the jog dial driver 54D will inform the jog dial status monitoring program 54C executed by the same CPU 51, that the jog dial 4 has been operated as in the above.

Then, a list of jog dial-ing applications pre-registered for launching is displayed as shown in FIG. 32.

If there exists an active application in step S15 in FIG. 30, the CPU 51 will go to the event-drive mode. This event-driven mode of operation is valid only when the CPU 51 executes the jog dial status monitoring program 54C after the power switch 9 is turned on and it finds an active application in step S15 in FIG. 30. The active application should be a jog dial-ing one. The event-driven mode will be explained with an active application "Map display" with an image displaying function.

Figure 32C:
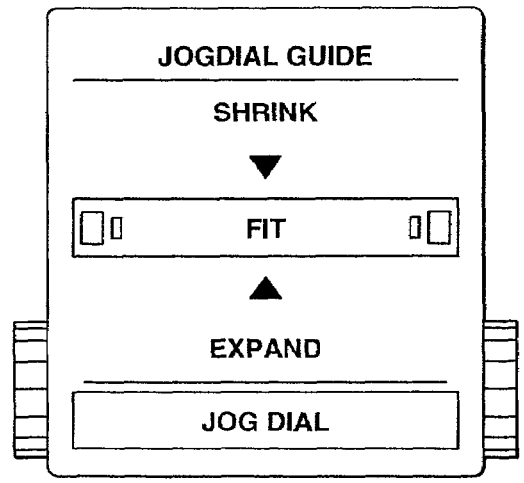
Figure 33:
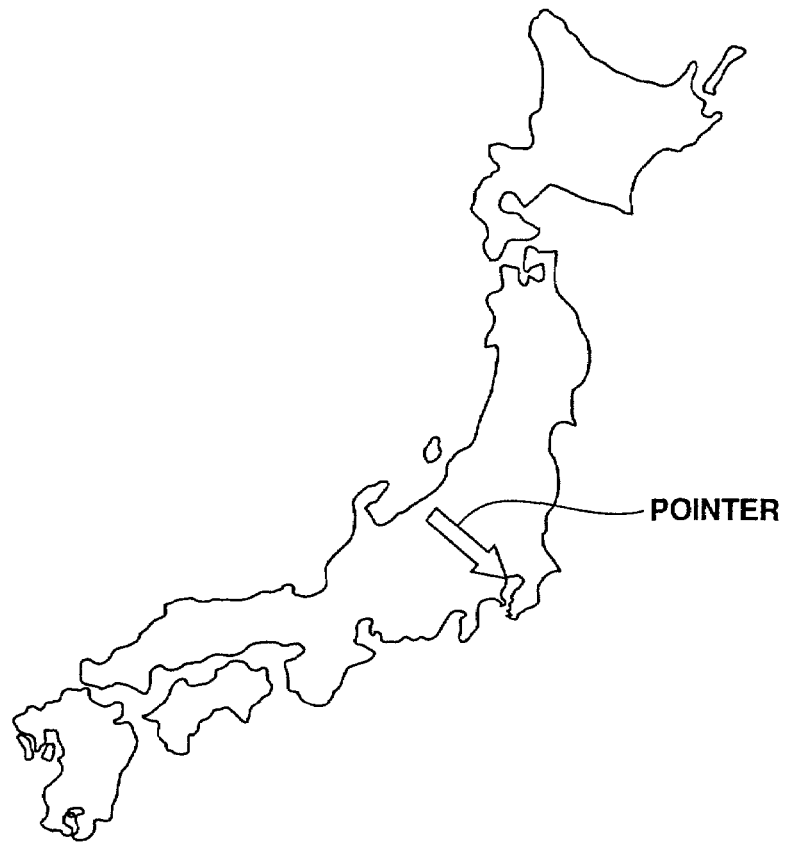
FIG. 33 shows an example of the display by a map-display application program.
Figure 34:
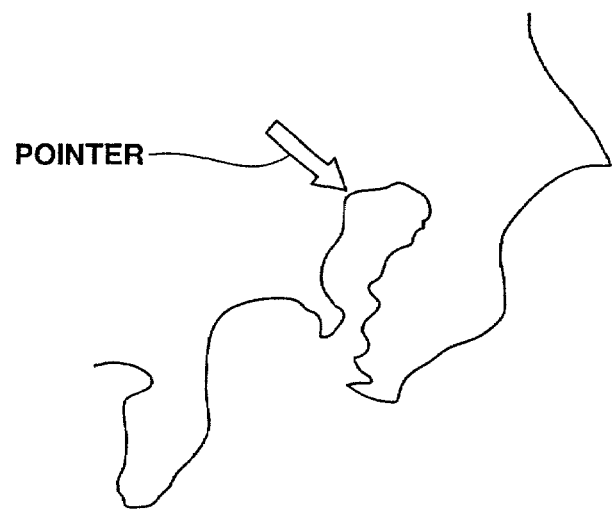
FIG. 34 shows another example of the display by the map-display application program.

In this example, it is assumed that a map of Japan as shown in FIG. 33 is displayed on the LCD 8 under the application program. At this time, the jog dial window 90 showing a guided status of the jog dial ("JOG DIAL GUIDE") as in FIG. 32C is displayed on the LCD 8. As the user rotates the jog dial 4 with the "JOG DIAL GUIDE" displayed in the jog dial window 90, the map image will be expanded around a spot pointed by a pointer as shown in FIG. 34. On the other hand, by rotating the jog dial 4 in an opposite direction to that for expansion of the image, the image will be shrunk (to the initial status). In this way, under a predetermined application program supporting the jog dial and having the image display function, an image displayed on the LCD 8 can be expanded or shrunk as selected by rotating the jog dial 4.

Figure 31:
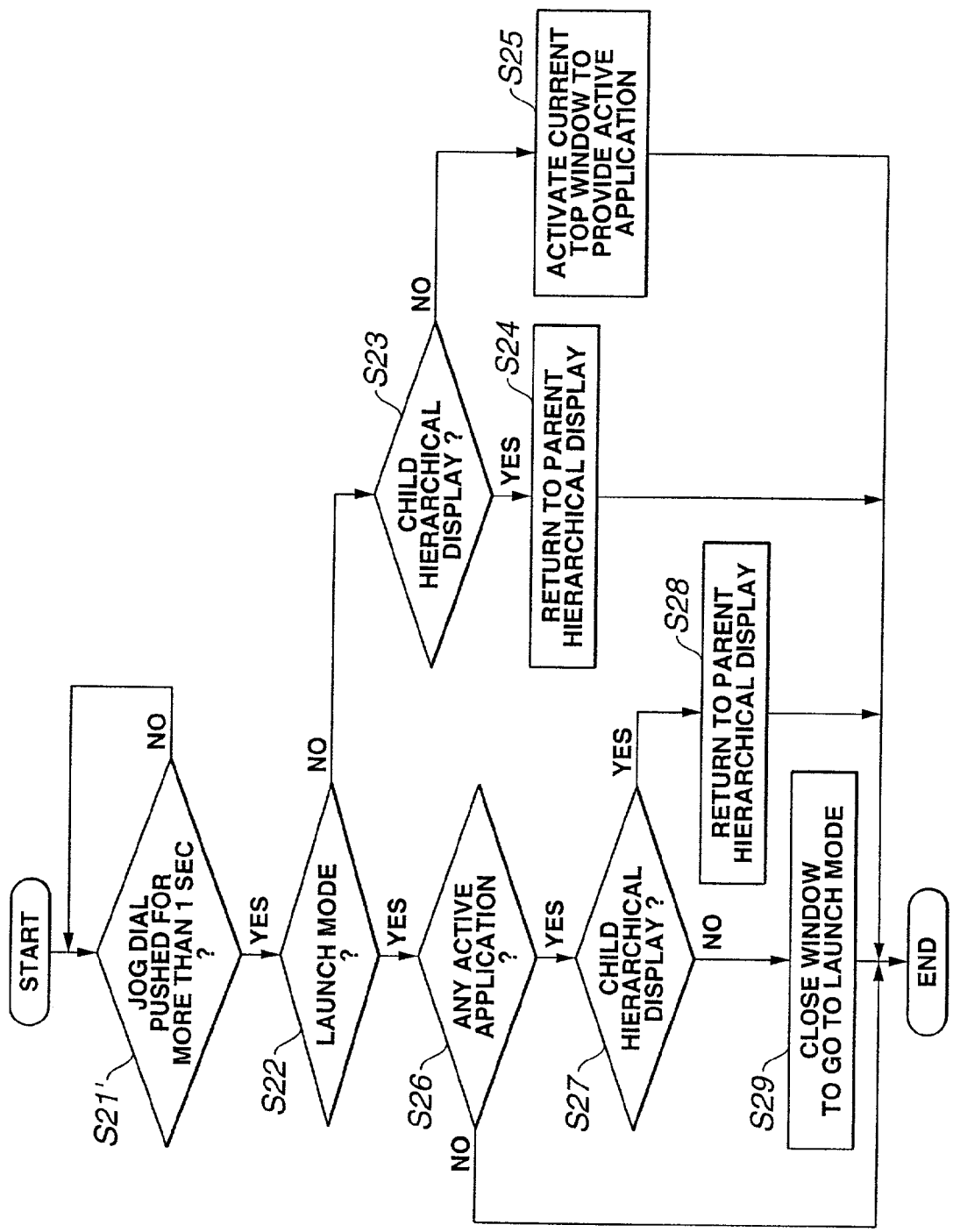
FIG. 31 is a flow chart of operations effected when the jog dial of the notebook PC which is the fourth embodiment of the present invention is pushed for more than 1 second.

Next, an operation in step S14' in FIG. 30, that is, an operation corresponding to pushing of the jog dial 4, will further be described with reference to FIG. 31.

When the CPU 51 judges in step S21' that the jog dial 4 has been pushed for more than 1 sec, it will go to step S22 and subsequent steps. In step S22, it will judge whether the launching mode of operation has already been set up. If it is judged that the launching mode has been set up (YES), the CPU 51 goes to step S23 where it will judge whether the applications are displayed in a child hierarchy.

If the judgement in step S23 is that applications are displayed in the child hierarchy, it means that it has been judged in step S21 that the jog dial 4 has been pushed for more than 1 sec. So, the CPU 51 goes to step S24 where the parent hierarchical display as in FIG. 32A will be restored. On the other hand, if is has been judged in step S23 that the applications are not displayed in any child hierarchy (NO), the CPU 51 goes to step S25 where it will activate a current top window to provide an active application.

When the CPU 51 has judged in step S22 that no launching mode is set up (NO), it will go to step S26 where it will judge whether there exists any active application. If the CPU 51 judges that there is an active application, it goes to step S27 where it will judge whether applications are displayed in a child hierarchy. The "child hierarchical" display is a child hierarchical display of jog dial guides. If the display as in FIG. 32C, namely, the guide display for "Expand" or "Shrink" in "Zoom" is a parent hierarchical display, guides for detailed scales for "Expand" or "Shrink" should be displayed in the child hierarchy.

When the CPU 51 has judged in step S27 that the applications are displayed in the child hierarchy (YES), it goes to step S28 where the applications are displayed in the parent hierarchy again. On the other hand, if the CPU 51 has judged in step S27 that the applications are not displayed in the child hierarchy (NO), it goes to step S29 where the active window will be closed and the launching mode will be set up.

Therefore, within the notebook PC NP with no back button as in the above, an operation selected once by pushing the jog dial 4 can be undone. Namely, the notebook PC NP can be used with an improved operability.

Note that in the notebook PC, the jog dial may be located, with no back button, in any other position that the intermediate position between the right and left ends of the body unit 2 as shown in FIG. 1 or the other drawing.

Figure 35:
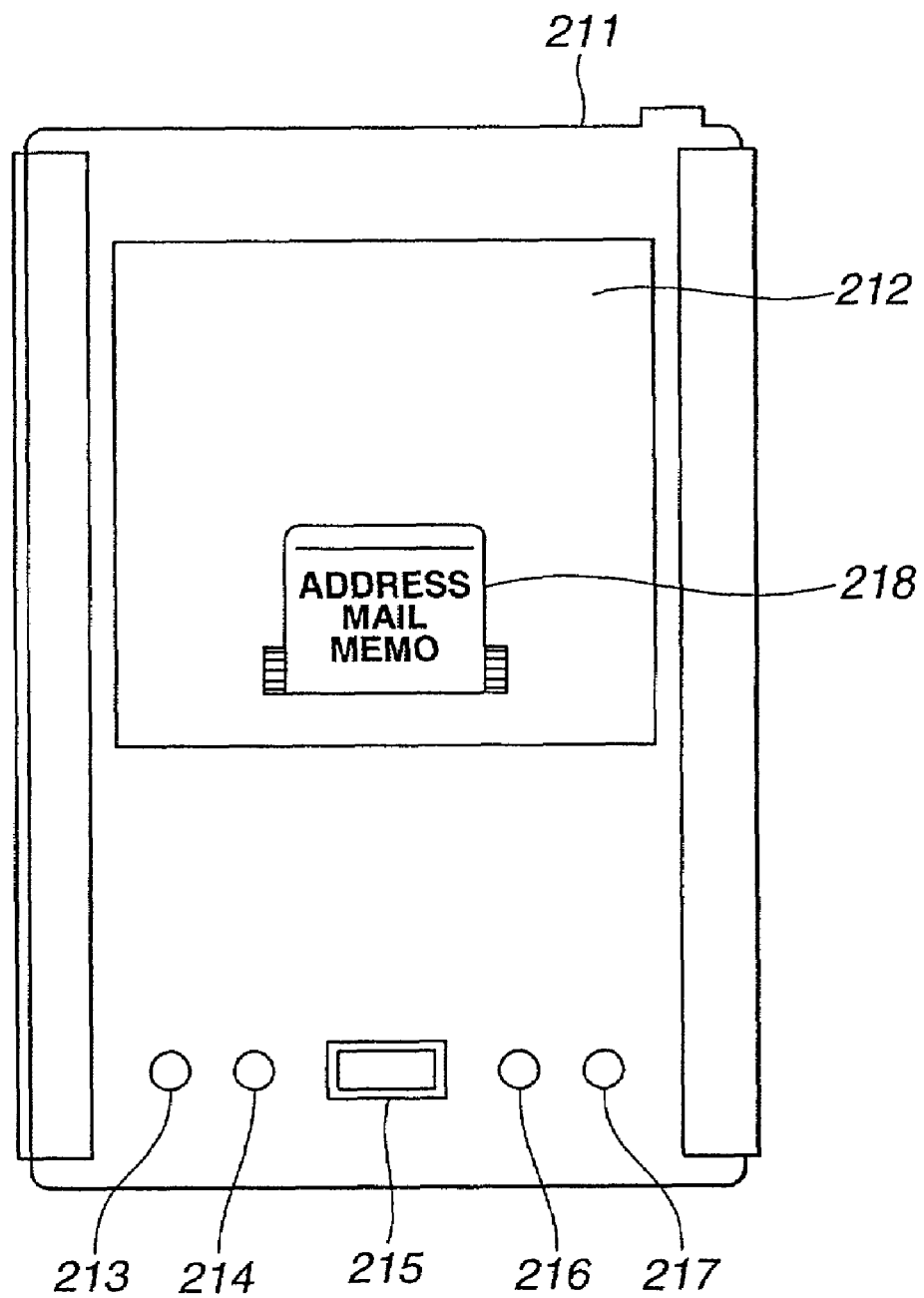
FIG. 35 is a plan view of a portable digital assistant (PDA) which is a fifth embodiment of the present invention.

Next, a personal digital assistant (PDA) 210 being the fifth embodiment of the present invention will be described with reference to FIG. 35.

As shown, the PDA 210 includes a body unit 211 and a LCD display screen 212 provided in an upper portion of the body unit 211. It has also a schedule button 213, address book button 214, To do button 216, and a scratch pad button 217 provided in a lower portion of the body unit 211. Also, a jog dial 215 having a similar rotor to that in the previously described jog dial 4 is provided between the address book list button 214.

The PDA 210 includes a CPU to which an accessory memory is connected via a bus, and a display unit, character recognition unit, sound recognition unit and a communications unit connected via the bus.

Further, the PDA 210 has a speaker, image pickup and a microphone. It has also a headphone terminal, and line input and output terminals. Therefore, the PDA 210 can output a sound and receives a sound input, and also acquire a pick-up image. Furthermore, the PDA 210 has an IEEE 1394 terminal and USB terminal. It has also a modem of course, and thus can be connected to the Internet.

A window 218 indicating that for example the launching mode of operation is set up, is displayed on the display screen 212, as a graphic user interface for use to explain, to the user based on an image displayed in the window 218, how to operate the jog dial 215. Of course, the display screen 212 will also display a guided-status indicating window as a graphical user interface.

A display on the display screen 212, appearing correspondingly the operation of each of the aforementioned buttons, and operation of the graphical user interface, will be described herebelow. The schedule button 213 is to be used for providing, on the display screen 212, a display which enables the user to make input and check a schedule at every 5 minutes. Entry (write) of a schedule is made using a pen (not shown). In this case, a scheduled-time indication can be changed forward or backward by operating the jog dial 215 via the graphical user interface. Also, a scheduled date can be changed similarly.

The address book button 214 is for use to display personal data such as a telephone number, address or the like on the display screen 212. In this case, such data can be scrolled by operating the jog dial 215 via the graphical user interface.

The To Do button 216 is for use to display items going to be started including jobs, businesses or the like as listed on the display screen 212. In this case, such businesses can be scrolled by operating the jog dial 215 via the graphical user interface.

The scratch pad button 217 is to be used for displaying a scratch pad on the display screen 212 when the user wants to jot down a business or the like that came to him or her. In this case, such jotted-down businesses can be scrolled by operating the jog dial 215 via the graphical user interface.

With an application started up by using each of the above buttons, switching can be made between display modes or between hierarchies of display by pushing the jog dial 215. Furthermore, pushing the jog dial 215 for more than 1 sec will restore a current hierarchy of display back to an initial one and display a result of the switching on the display screen.

Figure 36:
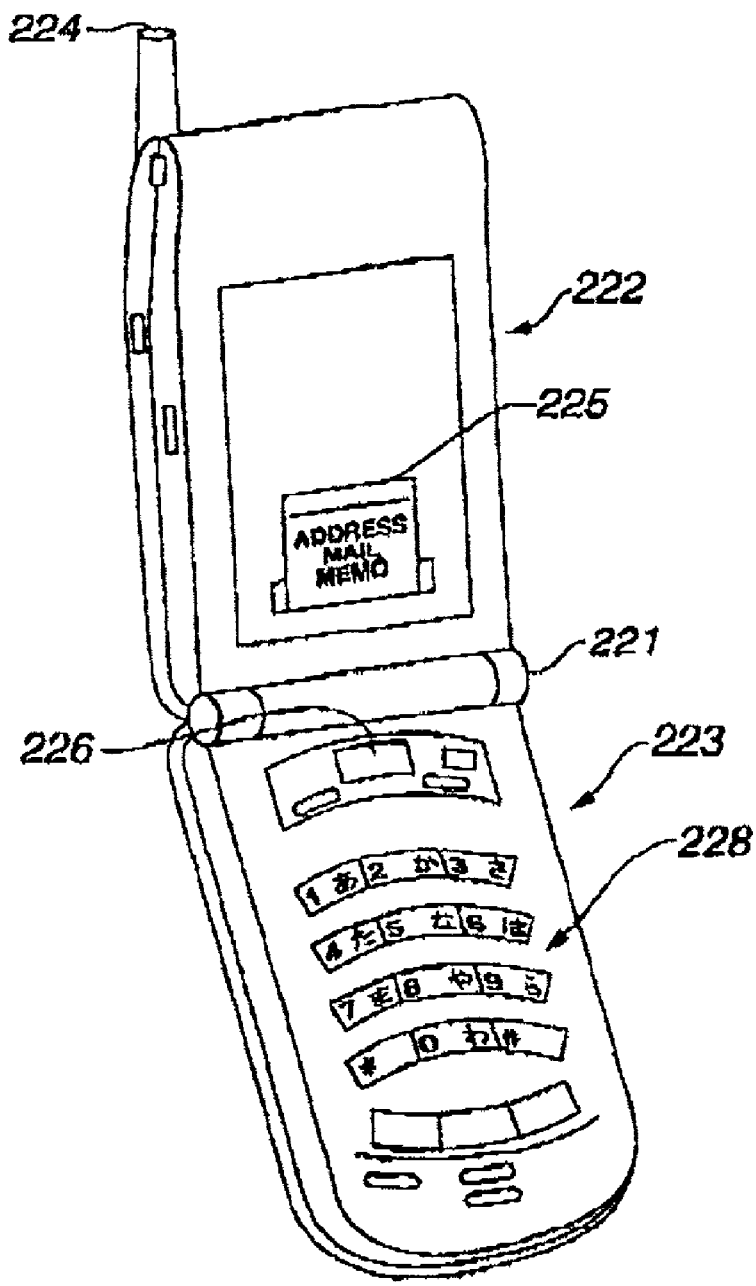
FIG. 36 is a perspective view of a mobile telephone which is a sixth embodiment of the present invention.

Next, a mobile telephone 220 being the sixth embodiment of the present invention will be described with reference to FIG. 36. As shown, the mobile telephone 220 is of a type consisting of a display unit 222 and body unit 223, either of which is pivotable about a rotation shaft 221 in relation to each other. Namely, the display unit 222 and body unit 223 can be opened from each other and closed to each other. Further, the mobile telephone 220 has an antenna 224 provided at the left upper corner of the display unit 222, and an LCD display screen provided in the center of the display unit 222. Also, operation keys 228 are disposed in the middle of the body unit 223. The body unit 223 has provided in an upper portion thereof a jog dial 226 constructed similarly to the jog dial 4 having previously been described.

A window 225 indicating that for example the launching mode of operation is set up, is displayed on the display screen, as a graphic user interface for use to explain, to the user based on an image displayed in the window 225, how to operate the jog dial 226. Of course, the display screen will also display a guided-status indicating window as a graphical user interface.

For example, for the user to recall a register telephone number to the display screen in response to an input operation of the jog dial 226, the user may rotate and push the job dial 226 to select a register telephone number recalling item from the window indicating that the graphical user interface is launched, and scroll the jog dial 226 upward or downward and push it while watching a guidance being made to select a telephone number, and dial the number thus selected.

Also, switching can be made between display modes or between hierarchies of display by pushing the jog dial 226. Furthermore, pushing the jog dial 226 for more than 1 sec will restore a current hierarchy of display back to an initial one and display a result of the switching on the display screen.

What is claimed is:

1. An information processor for processing information signals, the apparatus comprising:

an operating mechanism configured to select one of a plurality of operations when rotated and then pushed; and a controlling mechanism configured to monitor the operated status of the operating mechanism and to open an operation window, displaying each of the plurality of operations, according to the operated status of the operating mechanism, wherein the controlling mechanism is configured to detect a first pushed status of the operating mechanism, in which the operating mechanism has been pushed less than a predetermined length of time, and a second pushed status of the operating mechanism, in which the operating mechanism has been pushed for longer than the predetermined length of time, the controlling mechanism is configured to undo an operation previously selected by the first pushed status when the second pushed status is detected, and said operating mechanism is not rotated between when the first pushed status and the second pushed states are detected, the controlling mechanism is configured to detect the rotation and changes a menu item, and upon detecting the first push status, the controlling mechanism is configured to cause a display of an operation guidance window configured to guide use of an active application program, and to cause a display of an operation launching window configured to launch an application program when there is no active application program.

2. The apparatus according to claim 1, wherein each of the operation guidance window and operation launching window provides a two-step display in at least either a parent hierarchy or a child hierarchy.

3. The apparatus according to claim 2, wherein when an application program is activated, an application window is opened and an indication that the application program is activated is displayed.

4. The apparatus according to claim 3, wherein when the controlling mechanism detects the second pushed status of the operating mechanism while the operation launching window is being displayed in the child hierarchy, the controlling mechanism restores the operation launching window to the parent hierarchy.

5. The apparatus according to claim 3, wherein when the controlling mechanism detects the second pushed status of the operating mechanism while the operation launching window is being displayed in the parent hierarchy, the controlling mechanism closes the operation launching window and activates a current top application program.

6. The apparatus according to claim 3, wherein when the controlling mechanism detects the second pushed status of the operating mechanism while the operation launching window is being displayed in the child hierarchy, the controlling mechanism restores the operation guidance window to the parent hierarchy.

7. The apparatus according to claim 3, wherein when the controlling mechanism detects the second pushed status of the operating mechanism while the operation launching window is being displayed in the child hierarchy, the controlling mechanism closes the operation guidance window and an active application program, and then displays the operation launching window.

* * * * *